US012589864B2

(12) United States Patent
Takemura et al.

(10) Patent No.: US 12,589,864 B2
(45) Date of Patent: Mar. 31, 2026

(54) CONTROL DEVICE FOR ELECTRIC FLIGHT VEHICLE AND NON-TRANSITORY COMPUTER READABLE MEDIUM STORING COMPUTER PROGRAM FOR ELECTRIC FLIGHT VEHICLE

(71) Applicant: DENSO CORPORATION, Kariya (JP)

(72) Inventors: Yuichi Takemura, Kariya (JP); Masato Fukushi, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 18/643,381

(22) Filed: Apr. 23, 2024

(65) Prior Publication Data

US 2024/0270414 A1     Aug. 15, 2024

Related U.S. Application Data

(63) Continuation of application No. PCT/JP2022/041383, filed on Nov. 7, 2022.

(30) Foreign Application Priority Data

Nov. 30, 2021     (JP) ................................. 2021-194046

(51) Int. Cl.
*B64U 10/16*          (2023.01)
*B64C 27/08*          (2023.01)
(Continued)

(52) U.S. Cl.
CPC ............ *B64C 27/08* (2013.01); *B64D 27/357* (2024.01); *B64U 10/16* (2023.01); *B64U 50/37* (2023.01); *B64U 2201/00* (2023.01)

(58) Field of Classification Search
CPC ...... B64C 27/08; B64D 27/357; B64U 10/16; B64U 50/37; B64U 2201/00; B64U 50/19;
(Continued)

(56) References Cited

U.S. PATENT DOCUMENTS 9,352,635 B1 *   5/2016   Schepmann ....... B60H 1/00392
2012/0094152 A1 *   4/2012   Wu ..................... H01M 10/486
429/50
(Continued)

FOREIGN PATENT DOCUMENTS

CN          108312861 A      7/2018
JP       2021-013220 A      2/2021
(Continued)

OTHER PUBLICATIONS

Machine Translation: WO-2020022266-A1 (Year: 2020).*

*Primary Examiner* — Anne Marie Antonucci
*Assistant Examiner* — Connor L Knight
(74) *Attorney, Agent, or Firm* — OLIFF PLC.

(57) ABSTRACT

The disclosure relates to a technique for controlling an electric flight vehicle having a rotary wing driven by electric power of a battery. In the technique, a temperature of the battery is acquired as a battery temperature. Restriction is placed on take-off of the electric flight vehicle when the battery temperature is lower than a take-off permitting temperature that is a temperature for permitting take-off of the electric flight vehicle. The restriction placed on take-off of the electric flight vehicle may be terminated when the battery temperature exceeds a restriction terminating temperature and the battery temperature raising processing is performed. The restriction terminating temperature is higher than the take-off permitting temperature.

17 Claims, 8 Drawing Sheets

(51) Int. Cl.
_B64D 27/357_ (2024.01)
_B64U 50/37_ (2023.01)

(58) Field of Classification Search
CPC ....... B64U 50/30; B60L 3/0046; B60L 58/12;
B60L 58/25; H01M 10/613; H01M
10/615; H01M 10/625; H01M 10/63;
H01M 10/633; H01M 10/6571; H01M
10/486; H01M 2220/20; Y02T 50/60
See application file for complete search history.

(56) References Cited

U.S. PATENT DOCUMENTS

| | | | |
|---|---|---|---|
| 2015/0007583 A1 | 1/2015 | Murata et al. | |
| 2017/0217328 A1* | 8/2017 | Patel ........................ | B60K 1/04 |
| 2017/0301966 A1 | 10/2017 | Wang et al. | |
| 2020/0262313 A1* | 8/2020 | Muniz ..................... | B60L 58/16 |
| 2020/0303788 A1* | 9/2020 | Rheaume ............ | H01M 10/637 |
| 2020/0339010 A1* | 10/2020 | Villanueva ............ | B60L 3/0092 |
| 2021/0110724 A1 | 4/2021 | Wake et al. | |
| 2021/0309122 A1 | 10/2021 | Wake et al. | |

FOREIGN PATENT DOCUMENTS

| | | | | |
|---|---|---|---|---|
| JP | 2021-090315 A | 6/2021 | | |
| WO | 2018/076193 A1 | 5/2018 | | |
| WO | WO-2020022266 A1 * | 1/2020 | ............ | H01M 10/48 |

* cited by examiner

FIG. 3

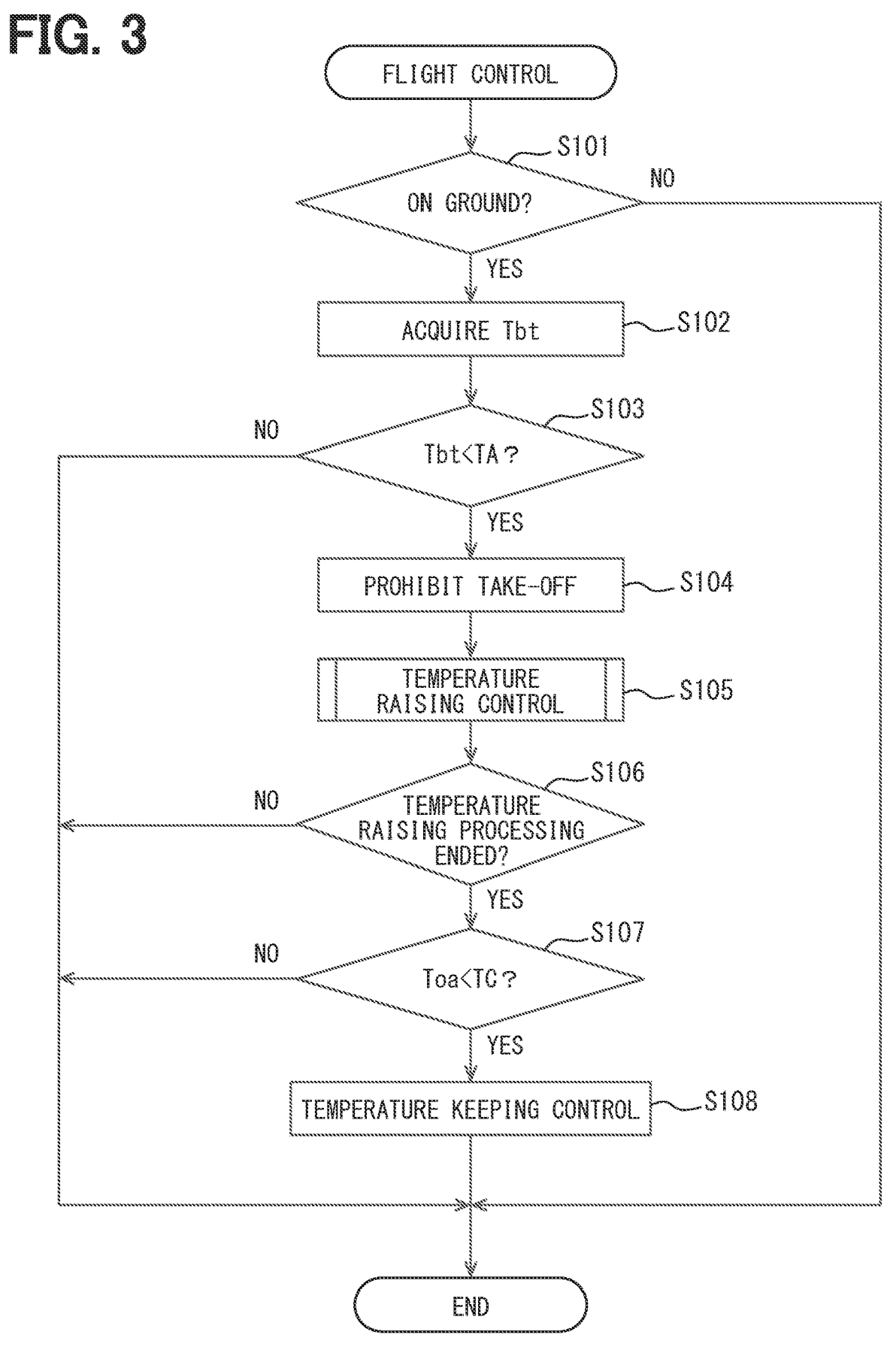

FLIGHT CONTROL

S101

ON GROUND? — NO

YES

ACQUIRE Tbt — S102

S103

$Tbt < TA$? — NO

YES

PROHIBIT TAKE-OFF — S104

TEMPERATURE RAISING CONTROL — S105

S106

TEMPERATURE RAISING PROCESSING ENDED? — NO

YES

S107

$Toa < TC$? — NO

YES

TEMPERATURE KEEPING CONTROL — S108

END

CONTROL DEVICE FOR ELECTRIC FLIGHT VEHICLE AND NON-TRANSITORY COMPUTER READABLE MEDIUM STORING COMPUTER PROGRAM FOR ELECTRIC FLIGHT VEHICLE

CROSS REFERENCE TO RELATED APPLICATIONS

The present application is a continuation application of International Patent Application No. PCT/JP2022/041383 filed on Nov. 7, 2022, which designated the U.S. and claims the benefit of priority from Japanese Patent Application No. 2021-194046 filed on Nov. 30, 2021. The disclosures of all the above applications are incorporated herein.

TECHNICAL FIELD

The present disclosure relates to a control vehicle for an electric flight vehicle.

BACKGROUND

An unmanned flight vehicle flies with multiple rotary wings. In this unmanned flight vehicle, the rotary wings are driven to rotate by driving of an electric motor. The electric motor can be driven by electric power supplied from a battery.

SUMMARY

According to an aspect of the present disclosure, a control device for an electric flight vehicle is configured to control the electric flight vehicle and provided in the electric flight vehicle having a rotary wing driven by electric power of a battery. The rotary wing is configured to rotate and cause the electric flight vehicle to fly. The control device includes a temperature acquisition unit configured to acquire a temperature of the battery as a battery temperature, and a take-off restriction unit configured to place restriction on take-off of the electric flight vehicle when the battery temperature acquired by the temperature acquisition unit is lower than a take-off permitting temperature that is a temperature for permitting take-off of the electric flight vehicle.

BRIEF DESCRIPTION OF DRAWINGS

The details of one or more embodiments are set forth in the accompanying drawings and the description below. Other features and advantages will be apparent from the description and drawings, and from the claims.

FIG. 3 is a flowchart illustrating a procedure of flight control processing.

DETAILED DESCRIPTION

Figure 1:
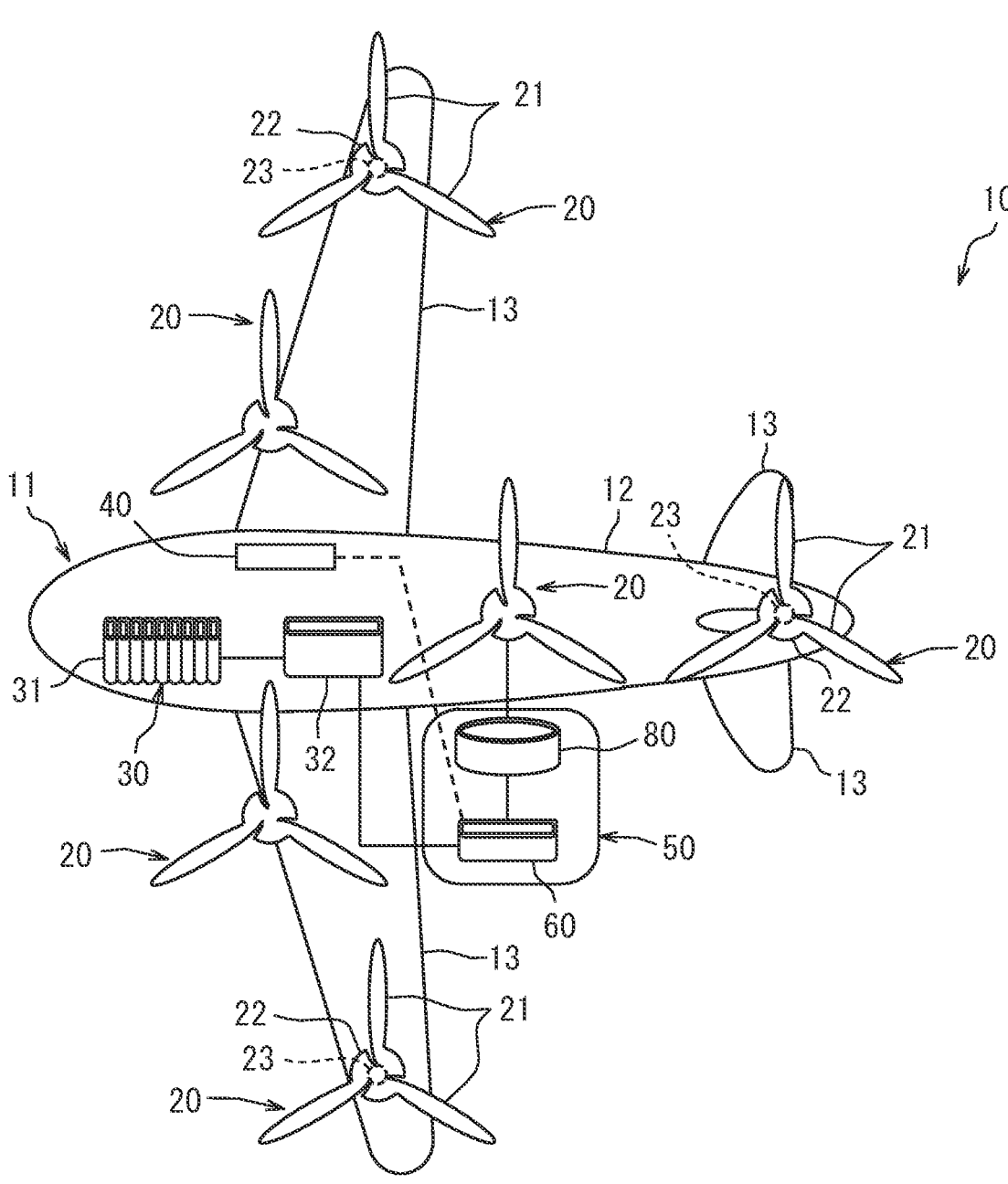
FIG. 1 is a diagram illustrating a configuration of an eVTOL according to a first embodiment.

To begin with, examples of relevant techniques will be described. An unmanned flight vehicle according to a comparative example flies with multiple rotary wings. In this unmanned flight vehicle, the rotary wings are driven to rotate by driving of an electric motor. The electric motor can be driven by electric power supplied from a battery. The unmanned flight vehicle is an electric-powered electric flight vehicle.

The unmanned flight vehicle of the comparative example is an electric-powered electric flight vehicle. In the electric flight vehicle, when a temperature of the battery is too low, an output of the battery may be unstable, and there is a concern that an output of the rotary wing may be insufficient. When the output of the rotary wing is insufficient, safety at the time of flight of the electric flight vehicle is likely to deteriorate.

In contrast, according to the present disclosure, a control device for an electric flight vehicle is capable of enhancing safety when a temperature of a battery in the electric flight vehicle decreases.

According to an aspect of the present disclosure, a control device for an electric flight vehicle is configured to control the electric flight vehicle and provided in the electric flight vehicle having a rotary wing driven by electric power of a battery. The rotary wing is configured to rotate and cause the electric flight vehicle to fly. The control device includes a temperature acquisition unit configured to acquire a temperature of the battery as a battery temperature, and a take-off restriction unit configured to place restriction on take-off of the electric flight vehicle when the battery temperature acquired by the temperature acquisition unit is lower than a take-off permitting temperature that is a temperature for permitting take-off of the electric flight vehicle.

According to the above aspect, when the temperature of the battery is lower than the take-off permitting temperature, the take-off of the electric flight vehicle is restricted. With this configuration, it is possible to restrict a situation in which the electric flight vehicle takes off even though there is a concern that the output of the rotary wing is insufficient due to the temperature of the battery being lower than the take-off permitting temperature. Therefore, it is possible to enhance safety when the temperature of the battery has decreased in the electric flight vehicle.

Hereinafter, multiple embodiments will be described with reference to the drawings. Elements corresponding to each other among the embodiments are assigned the same numeral and their descriptions may be omitted. When only a part of a component is described in an embodiment, the other part of the component can be relied on the component of a preceding embodiment. Furthermore, in addition to the combination of components explicitly described in each embodiment, it is also possible to combine components from different embodiments, as long as the combination poses no difficulty, even if not explicitly described.

First Embodiment

A flight system 30 illustrated in FIG. 1 is mounted on an eVTOL 10. The eVTOL 10 is an electric vertical take-off and landing aircraft. The electric vertical take-off and landing aircraft is an electric-powered vertical take-off and landing aircraft, and can take off and land vertically. The eVTOL is an abbreviation for electric vertical take-off and landing aircraft. The eVTOL 10 is an electric-powered flight vehicle flying in the atmosphere. The eVTOL 10 is also an electric-powered aircraft and may be referred to as an electric aircraft. The eVTOL 10 is a manned flight vehicle carrying an occupant. The occupant of the eVTOL 10 includes a pilot as an operator. The flight system 30 is a system driven to fly the eVTOL 10. The flight system 30 may be referred to as a propulsion system.

The eVTOL 10 includes an airframe 11 and a rotor 20. The airframe 11 includes an airframe body 12 and a wing 13. The airframe body 12 is a body of the airframe 11 and has, for example, a shape extending in a front-rear direction. The airframe body 12 has an occupant compartment for carrying an occupant. Multiple wings 13 extend from the airframe body 12 and are provided on the airframe body 12. The wings 13 are fixed wings. The multiple wings 13 include main wings, tail wings, and the like.

Multiple rotors 20 are provided on the airframe 11. The eVTOL 10 is provided with at least four rotors 20. The rotors 20 are provided on the airframe body 12 and the wings 13. The rotor 20 rotates about a rotor axis. The rotor axis is a rotation axis of the rotor 20 and coincides with a center line of the rotor 20. The rotor 20 is a rotor wing, and can generate thrust and lift on the eVTOL 10. A force generated when the eVTOL 10 ascends may be referred to as thrust.

The rotor 20 includes a blade 21, a rotor head 22, and a rotor shaft 23. Multiple blades 21 are arranged in a circumferential direction. The rotor head 22 couples the multiple blades 21. The blades 21 extend in a radial direction from the rotor head 22. The blades 21 are vanes that rotate together with the rotor shaft 23. The rotor shaft 23 is a rotation shaft of the rotor 20 and extends from the rotor head 22 along the rotor axis.

The eVTOL 10 is a tiltrotor aircraft. In the eVTOL 10, the rotor 20 can be tilted. That is, a tilt angle of the rotor 20 is adjustable. For example, when the eVTOL 10 ascends, an orientation of the rotor 20 is set such that the rotor axis extends in an up-down direction. In this case, the rotor 20 functions as a lift rotor for generating lift on the eVTOL 10. The lift rotor also functions as a hovering rotor for causing the eVTOL 10 to hover. The lift rotor can also cause the eVTOL 10 to descend. The hovering rotor may be referred to as a hover rotor.

When the eVTOL 10 advances in a front direction, the orientation of the rotor 20 is set such that the rotor axis extends in the front-rear direction. In this case, the rotor 20 functions as a cruise rotor for generating thrust on the eVTOL 10. In the present embodiment, a front direction of a pilot is defined as a front direction of the eVTOL 10. A direction in which the eVTOL 10 advances in a horizontal direction may be defined as the front direction regardless of the front direction of the pilot. In this case, the eVTOL 10 normally advances in the front direction even when a traveling direction thereof changes.

The eVTOL 10 includes a tilt mechanism (not shown). The tilt mechanism includes a motor and the like, and is driven to adjust the tilt angle of the rotor 20. The tilt mechanism may be referred to as a tilt drive unit. For example, in the eVTOL 10, the wings 13 can be tilted relative to the airframe body 12. That is, the rotors 20 can be tilted together with the wings 13. In the eVTOL 10, the tilt angle of the rotor 20 is adjusted by adjusting an inclination angle of the wing 13 with respect to the airframe body 12. In the eVTOL 10, the tilt mechanism adjusts the inclination angle of the wing 13.

In the eVTOL 10, the rotor 20 may be capable of tilting relative to the airframe 11. For example, the tilt angle of the rotor 20 may be adjusted by adjusting a relative inclination angle of the rotor 20 with respect to the wing 13.

Figure 2:
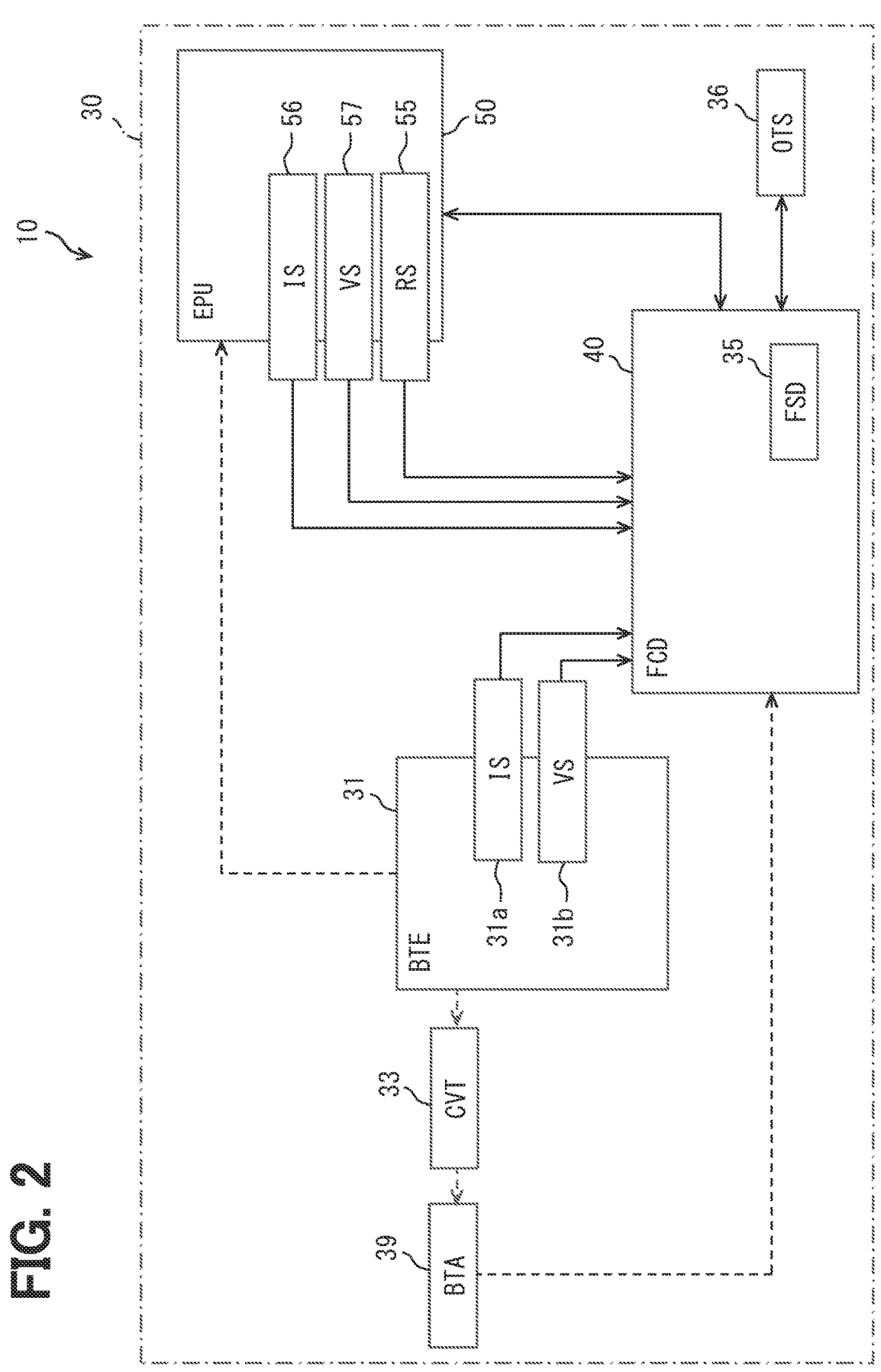
FIG. 2 is a block diagram illustrating an electrical configuration of a flight system.

As illustrated in FIGS. 1 and 2, the flight system 30 includes a drive battery 31, a distributor 32, a converter 33, an outside air temperature sensor 36, an auxiliary battery 39, a flight control device 40, and an EPU 50. The EPU 50 includes a rotation sensor 55, a current sensor 56, and a voltage sensor 57. The drive battery 31 includes a current sensor 31a and a voltage sensor 31b. The flight control device 40 includes a storage device 35. In FIG. 2, the drive battery 31 is denoted by BTE, the storage device 35 by FSD, the outside air temperature sensor 36 by OTS, the auxiliary battery 39 by BTA, and the flight control device 40 by FCD. In the EPU 50, the rotation sensor 55 is denoted by RS, the current sensor 56 by IS, and the voltage sensor 57 by VS. In the drive battery 31, the current sensor 31a is denoted by IS, and the voltage sensor 31b is denoted by VS. In FIG. 2, illustration of the distributor 32 is omitted.

The EPU 50 is a device that drives the rotor 20 to rotate, and corresponds to a drive device. The EPU is an abbreviation for electric propulsion unit. The EPU 50 may be referred to as an electric drive device. The EPU 50 is individually provided for each of the multiple rotors 20. The EPU 50 is aligned with the rotor 20 along the rotor axis. Each of the multiple EPUs 50 is fixed to the airframe 11. The EPU 50 rotatably supports the rotor 20. The EPU 50 is mechanically connected to the rotor shaft 23. The multiple EPUs 50 include at least one of the EPU 50 fixed to the airframe 11 in a state of protruding outside the airframe 11 and the EPU 50 fixed to the airframe 11 in a state of being embedded inside the airframe 11.

The rotor 20 is fixed to the airframe 11 via the EPU 50. The EPU 50 is designed so as not to tilt relative to the rotor 20. The EPU 50 may be tilted together with the rotor 20. When the tilt angle of the rotor 20 is adjusted, an orientation of the EPU 50 is set together with the rotor 20.

The EPU 50 includes a motor device 80 and an inverter device 60. The motor device 80 includes a motor and a motor housing. The motor is housed in the motor housing. The motor is a multi-phase AC motor, for example, a three-phase AC rotary electric machine. The motor functions as an electric motor that is a flight driving source of the eVTOL 10. The motor includes a rotor and a stator. The motor is driven by electric power of the drive battery 31. In the EPU 50, a rotation shaft of the motor is connected to the rotor 20, and the rotor 20 rotates when the rotation shaft of the motor rotates. By driving of the motor, the EPU 50 drives the rotor 20 to rotate. As the motor, for example, a brushless motor is used. As the motor, an induction motor or a reactance motor may be used.

The inverter device 60 includes an inverter and an inverter housing. The inverter is housed in the inverter housing. The inverter drives the motor by converting electric power supplied to the motor. The inverter may be referred to as a drive unit. The inverter converts the electric power to be supplied to the motor from a direct current to an alternating current. The inverter is an electric power conversion unit that converts the electric power. The inverter is a multi-phase electric power conversion unit, and performs electric power conversion for each of the multiple phases. The inverter is, for example, a three-phase inverter. The motor is driven according to a voltage and a current supplied from the inverter.

In the EPU 50, the driving of the motor device 80 is controlled according to detection results of the sensors 55 to 57 and the like. For example, the EPU 50 includes a drive control unit that controls driving of the motor device 80. The drive control unit is electrically connected to the inverter and the sensors 55 to 57. The sensors 55 to 57 output the detection results to the drive control unit. The drive control unit performs motor control via the inverter. The drive control unit is electrically connected to the flight control device 40, and performs motor control according to a signal from the flight control device 40. The flight control device 40 may directly control the motor and the like for the EPU 50.

The rotation sensor 55 is provided for the motor. The rotation sensor 55 detects the number of rotations of the motor. The rotation sensor 55 includes, for example, an encoder and a resolver. The number of rotations of the motor is, for example, the number of rotations per unit time. The current sensor 56 detects a current flowing through the motor as a motor current. The current sensor 56 detects a motor current for each of the multiple phases, for example. The voltage sensor 57 detects a voltage output from the inverter as an inverter voltage. The rotation sensor 55, the current sensor 56, and the voltage sensor 57 are electrically connected to the flight control device 40, and output detection signals to the flight control device 40.

The EPU 50 may include a blower fan. The blower fan can blow air toward the motor device 80 and the inverter device 60. The blower fan is connected to the rotation shaft of the motor, and blows air by rotating together with the rotation shaft of the motor. In the EPU 50, air sent by the blower fan flows along an outer surface of the motor device 80 and an outer surface of the inverter device 60. Heat of the motor device 80 and the inverter device 60 is transferred to the air from the blower fan, and thus the motor device 80 and the inverter device 60 radiate heat and are cooled.

The drive battery 31 is electrically connected to the multiple EPUs 50. The drive battery 31 is an electric power supply unit that supplies electric power to the EPU 50, and corresponds to a power supply unit. The drive battery 31 is a battery for driving the EPU 50, and may be referred to as a drive dedicated battery. The drive battery 31 is a DC voltage source that applies a DC voltage to the EPU 50. The drive battery 31 includes a rechargeable secondary battery. Examples of the secondary battery include a lithium-ion battery and a nickel-hydrogen battery. The drive battery 31 can store electric power, and corresponds to a power storage device. The drive battery 31 includes multiple cells. The cells are storage batteries constituting the drive battery 31. The drive battery 31 is referred to as an assembled battery, and the cells may be referred to as battery cells.

In the drive battery 31, a current is detected by the current sensor 31*a*. The current sensor 31*a* detects a battery current of the drive battery 31. The battery current includes an output current output from the drive battery 31 and an input current input to the drive battery 31. The output current is a discharging current discharged from the drive battery 31. The input current is a charging current for charging the drive battery 31.

When the output current of the drive battery 31 is referred to as a battery output current Ibt and a device and equipment through which the battery output current Ibt flows are referred to as an object to be energized, the object to be energized is electrically connected to the drive battery 31. When the object to be energized is energized by the battery output current Ibt, the electric power of the drive battery 31 is consumed. The battery output current Ibt corresponds to a current that is output from the drive battery 31 to the object to be energized. Examples of the object to be energized include the EPU 50, the tilt mechanism, and an air conditioner. The air conditioner performs air conditioning for an occupant compartment and a cargo compartment in which a load is loaded. When the object to be energized is driven by the electric power of the drive battery 31, the battery output current Ibt is output from the drive battery 31 accompanying the driving of the object to be energized. In this case, the electric power of the drive battery 31 is consumed as the battery output current Ibt. The value of the battery output current Ibt is the energization amount to the object to be energized.

In the drive battery 31, a battery voltage is detected by the voltage sensor 31*b*. The battery voltage is a voltage of the electric power output from the drive battery 31, and is an output voltage. The current sensor 31*a* and the voltage sensor 31*b* are electrically connected to the flight control device 40 and output detection signals to the flight control device 40.

The distributor 32 is electrically connected to the drive battery 31 and the multiple EPUs 50. The distributor 32 distributes electric power from the drive battery 31 to the multiple EPUs 50. The drive battery 31 is electrically connected to the multiple EPUs 50 via the distributor 32. The drive battery 31 supplies electric power to the EPU 50 via the distributor 32. When a voltage of the drive battery 31 is referred to as a high voltage, the high voltage is applied to the inverter described later in the EPU 50. The distributor 32 may be omitted as long as the electric power of the drive battery 31 is supplied to the multiple EPUs 50. As the configuration in which the distributor 32 may be omitted, for example, there is a configuration in which each of the multiple EPUs 50 is individually provided with the power supply unit.

The outside air temperature sensor 36 detects an outside air temperature Toa. The outside air temperature sensor 36 is provided outside the eVTOL 10, and detects a temperature of outside air as the outside air temperature Toa. The outside air temperature sensor 36 is electrically connected to the flight control device 40 and outputs a detection signal to the flight control device 40.

The flight control device 40 illustrated in FIG. 2 is, for example, an ECU, and performs flight control for causing the eVTOL 10 to fly. The flight control device 40 is a control device that controls the flight system 30, and controls, for example, the EPU 50. The ECU is an abbreviation for electronic control unit. The flight control device 40 is mainly implemented by a microcomputer including, for example, a processor, a memory, an I/O, and a bus that connects these components. The microcomputer may be referred to as a micro computer. The memory is a non-transitory tangible storage medium that non-temporarily stores computer readable programs and data. The non-transitory tangible storage medium is implemented by a semiconductor memory, a magnetic disk, or the like.

The flight control device 40 is electrically connected to the EPU 50. The flight control device 40 executes a control program stored in at least one of the memory and the storage device 35 to execute various types of processing related to the flight control. The flight control device 40 performs the flight control according to detection results of various sensors and the like. The various sensors include the current sensor 31*a* and the outside air temperature sensor 36. The flight control includes drive control for driving the EPU 50, tilt angle control for adjusting the tilt angle, and take-off preparation control for performing take-off preparation of the eVTOL 10, and the like. The storage device 35 stores information on the flight control such as a control program.

The various sensors include the rotation sensor 55, the current sensors 31*a* and 56, the voltage sensors 31*b* and 57, and the like. The storage device 35 may be provided independently of the flight control device 40. In this case, it is preferable that the storage device 35 and the flight control device 40 can communicate with each other.

The auxiliary battery 39 is electrically connected to the flight control device 40 via the converter 33. The auxiliary battery 39 is an electric power supply unit that supplies electric power to the flight control device 40, and corresponds to a power supply unit. The auxiliary battery 39 is a battery for driving auxiliaries such as the flight control device 40, and may be referred to as an auxiliary dedicated device. In addition to the flight control device 40, examples of the auxiliaries include a control device of the EPU 50, and various sensors. The auxiliaries are electrically connected to the auxiliary battery 39. Similarly to the drive battery 31, the auxiliary battery 39 includes a chargeable and dischargeable secondary battery. The auxiliary battery 39 can store electric power and corresponds to a power storage device.

The auxiliary battery 39 outputs a voltage lower than that of the drive battery 31. The voltage output from the drive battery 31 may be referred to as a high voltage, and the voltage output from the auxiliary battery 39 may be referred to as a low voltage. The converter 33 steps down the electric power from the drive battery 31 and supplies the stepped-down electric power to the auxiliary battery 39. The converter 33 converts a high voltage from the drive battery 31 to a low voltage and applies a constant voltage to the auxiliary battery 39.

The flight control device 40 performs flight control processing for causing the eVTOL 10 to fly. The flight control device 40 controls driving and rotation of the rotor 20 via, for example, the EPU 50 in the flight control processing. The eVTOL 10 corresponds to an electric flight vehicle, and the flight control device 40 corresponds to a control device of the electric flight vehicle. The flight control device 40 may be referred to as a flight controller.

The flight control processing will be described with reference to the flowchart of FIG. 3. The flight control device 40 repeatedly executes the flight control processing at a predetermined control cycle. The flight control device 40 has a function of executing processing of each step of the flight control processing.

In step S101 illustrated in FIG. 3, the flight control device 40 determines whether the eVTOL 10 is on the ground. The flight control device 40 determines whether the eVTOL 10 is flying, and determines that the eVTOL 10 is on the ground when the eVTOL 10 is not flying. In the present embodiment, a state where the eVTOL 10 has landed is referred to as "being on the ground". When the eVTOL 10 is on the ground, the eVTOL 10 is present on the ground without flying. The case where the eVTOL 10 is on the ground includes, for example, a state of the eVTOL 10 before taking off. When the eVTOL 10 is not on the ground, the eVTOL 10 is in flight. In the present embodiment, a state in which the eVTOL 10 is flying is referred to as "being in flight".

When the eVTOL 10 is on the ground, the flight control device 40 proceeds to step S102. The flight control device 40 acquires a battery temperature Tbt in step S102. The battery temperature Tbt is a temperature of the drive battery 31. The battery temperature Tbt is a temperature of the whole drive battery 31, and is, for example, an average temperature of the multiple cells. The flight control device 40 acquires a temperature parameter related to the temperature of the drive battery 31, and estimates the battery temperature Tbt using the temperature parameter. Examples of the temperature parameter include the battery current and the outside air temperature Toa. The function of the flight control device 40 executing the processing of step S102 corresponds to a temperature acquisition unit.

In the drive battery 31, the multiple cells are unlikely to have the same temperature. That is, the multiple cells are likely to have different temperatures. Therefore, for example, in a configuration in which a temperature sensor is provided in the drive battery 31, a detection result of the temperature sensor tends to be a value corresponding to a temperature of a cell closest to the temperature sensor. For example, it is unclear whether the detection result of the temperature sensor is a temperature of a cell on a high temperature side among the multiple cells, a temperature of a cell on a low temperature side, or a temperature of a cell having an average temperature. That is, it is unclear whether the detection result of the temperature sensor is a temperature of a high-temperature portion that has a high temperature in the drive battery 31, a temperature of a low-temperature portion that has a low temperature, or a temperature of a portion that has an average temperature. As described above, in the configuration in which a temperature sensor is used to detect the battery temperature Tbt, detection accuracy of the battery temperature Tbt tends to be low.

The battery temperature Tbt of the drive battery 31 tends to correspond to a balance between heat generation and heat radiation. Regarding the heat generation, in a situation where the electric power of the drive battery 31 is consumed, the drive battery 31 is more likely to generate heat as the discharging current of the drive battery 31 is larger. In a situation where the drive battery 31 is charged, the heat is more likely to be generated as the charging current of the drive battery 31 is larger. Regarding the heat radiation, in a situation where the heat of the drive battery 31 is radiated to a cooling medium, the drive battery 31 radiates the heat more easily as a temperature difference between the battery temperature Tbt and the cooling medium is larger. Examples of the cooling medium include air such as outside air in contact with the drive battery 31 so as to enable heat exchange, and a liquid such as cooling water circulating to the drive battery 31 so as to enable heat exchange.

Examples of the method of estimating the battery temperature Tbt by the flight control device 40 include a method of constantly monitoring the battery temperature Tbt, a method of driving the flight system 30, and a method of using history information of the eVTOL 10.

Regarding the method of constantly monitoring the battery temperature Tbt, it is preferable that the flight system 30 includes a constant monitoring device. The constant monitoring device can acquire the battery temperature Tbt by, for example, monitoring the temperature parameter when a power switch of the eVTOL 10 is in an on-state or an off-state. The constant monitoring device includes, for example, a constant storage device and a constant calculation device. The constant storage device is provided independently of the storage device 35, for example. The constant calculation device is provided independently of the flight control device 40, for example. Regardless of whether the power switch of the eVTOL 10 is in the on-state or the off-state, the supply of electric power from the auxiliary battery 39 to the constant storage device and the constant calculation device is continued.

The constant calculation device acquires a battery outside temperature. The battery outside temperature is a temperature of a cooling medium or the like outside the drive battery 31. Examples of the battery outside temperature include the outside air temperature Toa and a cooling water temperature.

The constant calculation device acquires the temperature parameter by, for example, monitoring the battery current and the battery outside temperature. When the power switch of the eVTOL 10 is in the off-state, the battery current may be a charging current that flows accompanying the charging of the drive battery 31. Further, the battery current may be a discharging current that flows accompanying natural discharge of the drive battery 31.

Heat generation information on heat generation of the drive battery 31 and heat radiation information on heat radiation of the drive battery 31 are stored in the constant storage device. The heat generation information is information indicating a relationship between the battery current and a heat generation amount of the drive battery 31. Examples of the heat generation information include a heat generation map. The heat radiation information is information indicating a relationship between the battery outside temperature and a heat radiation amount of the drive battery 31. Examples of the heat radiation information include a heat radiation map.

The constant calculation device acquires the battery current, and estimates the heat generation amount of the drive battery 31 using the battery current and the heat generation information. The constant calculation device acquires the battery outside temperature, and estimates the heat radiation amount of the drive battery 31 using the battery outside temperature and the heat radiation information. The constant calculation device estimates the battery temperature Tbt by using the heat generation amount and the heat radiation amount of the drive battery 31. The constant calculation device estimates the battery temperature Tbt regardless of whether the power switch of the eVTOL 10 is in the on-state or in the off-state.

In the method of driving the flight system 30, the flight control device 40 drives the flight system 30 such that the electric power of the drive battery 31 is consumed. When the flight control device 40 drives the EPU 50 to drive the rotor 20 to rotate, an output current is output from the drive battery 31 to the EPU 50. In the drive battery 31, as the battery temperature Tbt decreases, an internal resistance increases, making it more difficult for the battery output current Ibt to flow. The storage device 35 stores temperature-current information indicating a relationship between the battery temperature Tbt and the battery current. The flight control device 40 acquires the battery output current Ibt when the EPU 50 is driven as the battery current, and estimates the battery temperature Tbt using the battery current and the temperature-current information. When the flight control device 40 drives the EPU 50 to drive the rotor 20 to rotate, the flight control device 40 outputs a command signal for driving the rotor 20 to rotate to the EPU 50 while restricting the rotation of the rotor 20 to such an extent that thrust at a level that causes the eVTOL 10 to ascend is not generated. This command signal may be referred to as a discharge command.

Regarding the method of using history information of the eVTOL 10, the history information is preferably stored in the storage device 35. The history information includes flight history information on a flight history of the eVTOL 10, charging history information on a charging history of the eVTOL 10, and the like. The flight control device 40 reads the history information from the storage device 35 and acquires an elapsed time from a previous flight or a previous charging as a stop time. The flight control device 40 acquires the battery outside temperature. Then, the flight control device 40 estimates the battery temperature Tbt using the stop time and the temperature outside the battery. For example, when the battery outside temperature is lower than a predetermined reference temperature and the stop time reaches a predetermined reference time, the flight control device 40 estimates that the battery temperature Tbt has decreased to a temperature close to the battery outside temperature. The reference temperature is assumed to be a fairly low temperature such as an outside air temperature in a cold region.

After step S102, the flight control device 40 proceeds to step S103 and determines whether the battery temperature Tbt is lower than a take-off permitting temperature TA. As described above, as the battery temperature Tbt decreases, it is more difficult for the battery output current Ibt to flow. Therefore, when the battery temperature Tbt is too low, the battery output current Ibt becomes unstable, and an output of the rotor 20 is likely to be insufficient due to a decrease in an output of the motor device 80 or the like. When the output of the rotor 20 is insufficient, for example, the number of rotations of the rotor 20 is insufficient, and the thrust generated on the eVTOL 10 is insufficient.

In contrast, the take-off permitting temperature TA is set to a temperature at which the battery output current Ibt flows so that the output of the rotor 20 is not insufficient. The take-off permitting temperature TA is a value set according to a test result or the like, and is stored in the storage device 35. For example, the take-off permitting temperature TA is set by assuming an upper limit value of an additional weight to be added to the eVTOL 10. Examples of the additional weight include a total weight of occupants to be carried by the eVTOL 10 and a total weight of loads to be loaded on the eVTOL 10. As a weight of the eVTOL 10 increases, the output of the rotor 20 required to fly the eVTOL 10 increases. For this reason, the take-off permitting temperature TA is set by assuming the upper limit value of the additional weight, and thus it is unlikely that the output of the rotor 20 is insufficient with respect to the weight of the eVTOL 10.

In step S103, a determination as to whether to start the take-off preparation of the eVTOL 10 is performed. The flight control device 40 performs a determination as to whether the battery temperature Tbt is lower than the take-off permitting temperature TA only when starting the take-off preparation of the eVTOL 10. The flight control device 40 determines to start the take-off preparation, for example, when the pilot performs an operation for performing the take-off preparation of the eVTOL 10. Examples of an operation for starting the take-off preparation include an operation for turning on the power switch of the eVTOL 10. The operation of a pilot corresponds to an instruction of the pilot. Examples of the operation of a pilot include a physical operation by hands, feet, or the like, and an operation based on voice.

When the battery temperature Tbt is lower than the take-off permitting temperature TA, the flight control device 40 proceeds to step S104. In step S104, the flight control device 40 prohibits take-off of the eVTOL 10. The flight control device 40 sets a take-off prohibition flag in the memory or the like. When the take-off prohibition flag is set, the flight control device 40 performs take-off prohibition processing. The take-off prohibition processing is processing of prohibiting the pilot from performing an operation for causing the eVTOL 10 to vertically take off. The take-off prohibition processing includes notification processing of notifying the pilot or the like that vertical take-off of the eVTOL 10 is prohibited. The take-off prohibition processing also includes restriction processing of restricting an operation unit, which is operated to cause the eVTOL 10 to vertically take off, so as not to operate. The flight control device 40 sets the take-off prohibition flag to restrict the take-off of the eVTOL 10. The function of the flight control device 40 executing the processing of step S104 corresponds to a take-off restriction unit.

Figure 4:
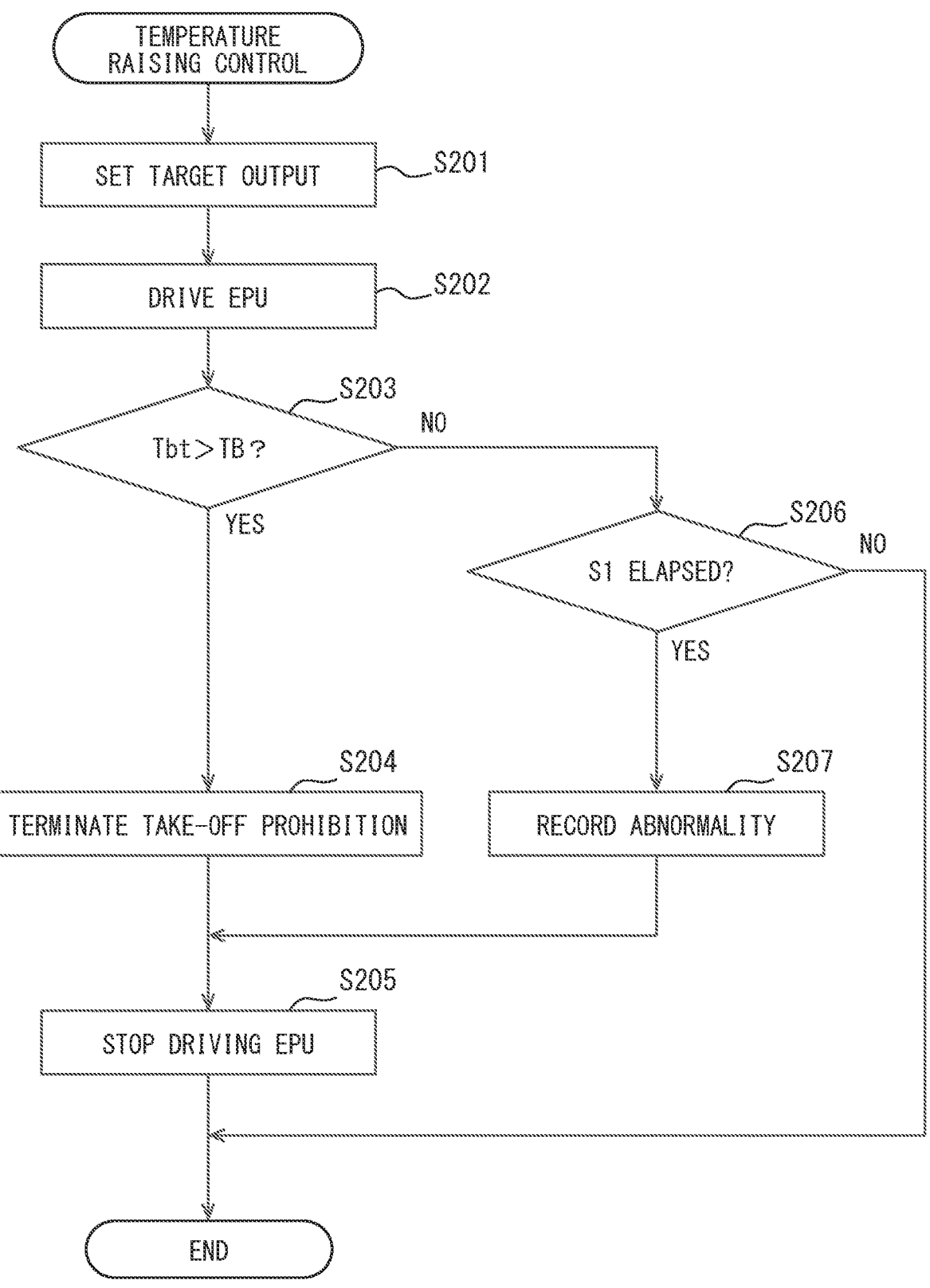
FIG. 4 is a flowchart illustrating a procedure of temperature raising control.

The flight control device 40 performs temperature raising control in step S105. The flight control device 40 performs the temperature raising control to raise the battery temperature Tbt. The temperature raising control will be described with reference to the flowchart of FIG. 4.

The flight control device 40 sets a target output in battery temperature raising processing in step S201 of the temperature raising control. The battery temperature raising processing is processing for raising the battery temperature Tbt. The flight control device 40 sets a target output of the EPU 50 as a target output related to the rotor 20 such that the rotor 20 is driven to rotate at the number of rotations at which the thrust at a level that causes the eVTOL 10 to ascend is not generated. For example, the flight control device 40 calculates a target torque corresponding to the target output of the EPU 50 for the motor device 80. The target torque is a target output of the motor device 80. The flight control device 40 sets the number of rotors 20 to be driven to rotate, and calculates the target output according to this number. For example, the flight control device 40 sets the target output to a smaller value as the number of rotors 20 to be driven to rotate increases.

In step S202, the flight control device 40 performs drive processing for driving the EPU 50 as the battery temperature raising processing. The flight control device 40 outputs the target output as a command signal to the EPU 50 and performs drive control of the EPU 50. For example, the flight control device 40 outputs the target torque as the target output to the motor device 80, and performs motor control on the motor device 80. When the rotor 20 is driven to rotate by the driving of the EPU 50, the battery output current Ibt flows through the EPU 50 and the electric power of the drive battery 31 is consumed. In this case, the drive battery 31 generates heat, and the battery temperature Tbt rises. In this case, the battery output current Ibt increases to a temperature raising current value IA. The function of the flight control device 40 executing the processing of step S202 corresponds to a battery temperature raising unit, an output execution unit, and a drive execution unit.

In step S202, the EPU 50 is driven to drive at least two of the at least four rotors 20 mounted on the eVTOL 10 to rotate. For example, in a case of a configuration in which one EPU 50 drives one rotor 20 to rotate, the flight control device 40 drives at least two EPUs 50 to drive at least two rotors 20 to rotate.

In step S203, the flight control device 40 determines whether the battery temperature Tbt is higher than a temperature raising end temperature TB. Here, a determination is performed as to whether the battery temperature Tbt has become higher than the temperature raising end temperature TB as the EPU 50 is driven. The temperature raising end temperature TB is a temperature serving as a determination reference for determining whether to end the battery temperature raising processing of the drive battery 31. That is, the temperature raising end temperature TB is a temperature for stopping the driving of the EPU 50. The temperature raising end temperature TB is set to a temperature higher than the take-off permitting temperature TA. The temperature raising end temperature TB is set to a temperature at which the battery output current Ibt flows so that the output of the rotor 20 becomes sufficiently high. The temperature raising end temperature TB is a value set according to a test result or the like, and is stored in the storage device 35.

When the battery temperature Tbt becomes higher than the temperature raising end temperature TB, the flight control device 40 proceeds to step S204. In step S204, the flight control device 40 terminates the take-off prohibition of the eVTOL 10. Here, take-off of the eVTOL 10 is permitted. The flight control device 40 clears the take-off prohibition flag set in the memory or the like. When the battery temperature Tbt becomes higher than the temperature raising end temperature TB, the flight control device 40 terminates the take-off prohibition of the eVTOL 10. For this reason, the temperature raising end temperature TB is also a temperature for terminating the take-off prohibition of the eVTOL 10. The temperature raising end temperature TB is a temperature for terminating take-off restriction of the eVTOL 10, and corresponds to a restriction terminating temperature. The function of the flight control device 40 executing the processing of step S204 corresponds to a control termination unit.

After step S204, the flight control device 40 proceeds to step S205 and stops driving the EPU 50. The flight control device 40 outputs a command signal for stopping the driving of the EPU 50 to the EPU 50. The flight control device 40 stops the driving of the EPU 50 to end the battery temperature raising processing. Further, the flight control device 40 sets, in the memory or the like, an end flag indicating that the battery temperature raising processing has ended. The function of the flight control device 40 executing the processing of step S205 corresponds to a temperature raising end unit.

When the battery temperature Tbt is not higher than the temperature raising end temperature TB, the flight control device 40 proceeds to step S206. In step S206, the flight control device 40 determines whether an upper limit time S1 has elapsed from the start of the driving of the EPU 50. Here, a determination as to whether a drive time of the EPU 50 has exceeded the upper limit time S1 is performed. The drive time is an elapsed time from the start of the driving of the EPU 50. The upper limit time S1 is an upper limit value of a time required until the battery temperature Tbt becomes higher than the temperature raising end temperature TB. When the eVTOL 10 is in a normal state, the battery temperature Tbt becomes higher than the temperature raising end temperature TB at a timing before the upper limit time S1 elapses from the start of the driving of the EPU 50. That is, when no abnormality has occurred in the eVTOL 10, the drive time does not exceed the upper limit time S1. The upper limit time S1 is a value set according to a test result or the like, and is stored in the storage device 35.

The flight control device 40 may variably set the upper limit time S1. For example, the flight control device 40 may set the upper limit time S1 to a longer time as the battery outside temperature is lower. The upper limit time S1 may be set to a longer time as the battery temperature Tbt immediately before starting the driving of the EPU 50 is lower.

When the upper limit time S1 has elapsed from the start of the driving of the EPU 50, the flight control device 40 determines that an abnormality has occurred in the eVTOL 10, and proceeds to step S207. In step S207, the flight control device 40 records a fact that the battery temperature Tbt has not become higher than the temperature raising end temperature TB even when the drive time of the EPU 50 reaches the upper limit time S1, as abnormality information indicating that an abnormality related to the battery temperature Tbt has occurred. The abnormality information is stored in the storage device 35, for example. The flight control device 40 may notify the pilot or the like that, as abnormality occurrence, the battery temperature Tbt does not rise normally.

After step S207, the flight control device 40 proceeds to step S205 and stops driving the EPU 50. In this case, the flight control device 40 stops driving the EPU 50, and does not terminate the take-off prohibition of the eVTOL 10. Therefore, a situation is restricted by the take-off prohibition flag where the eVTOL 10 takes off even though the battery temperature Tbt is not higher than the temperature raising end temperature TB. The flight control device 40 sets the end flag even when the take-off prohibition flag is not cleared.

In step S206, when the upper limit time S1 has not elapsed from the start of the driving of the EPU 50, the flight control device 40 ends the temperature raising control. In this case, the flight control device 40 does not stop the driving of the EPU 50 and does not terminate the take-off prohibition of the eVTOL 10.

Returning to FIG. 3, the flight control device 40 performs the temperature raising control in step S105, and then proceeds to step S106. In step S106, the flight control device 40 determines whether the battery temperature raising processing has ended. Here, a determination as to whether the end flag is set is performed. When the end flag is set, the flight control device 40 determines that the battery temperature raising processing has ended.

When the battery temperature raising processing has ended, the flight control device 40 proceeds to step S107. In step S107, the flight control device 40 determines whether the outside air temperature Toa is lower than a temperature keeping execution temperature TC. The flight control device 40 acquires the outside air temperature Toa using the detection signal of the outside air temperature sensor 36. For example, when the outside air temperature Toa is a very low temperature such as an outside air temperature in a cold region, even if the battery temperature Tbt becomes higher than the temperature raising end temperature TB by the battery temperature raising processing, there is a concern that the drive battery 31 is cooled by the outside air and the battery temperature Tbt decreases again. In contrast, the temperature keeping execution temperature TC is a temperature serving as a determination reference for determining whether to execute temperature keeping of the drive battery 31. The temperature keeping execution temperature TC is set to a temperature lower than the take-off permitting temperature TA. The temperature keeping execution temperature TC is a value set according to a test result or the like, and is stored in the storage device 35.

When the outside air temperature Toa is lower than the temperature keeping execution temperature TC, the flight control device 40 proceeds to step S108. The flight control device 40 performs temperature keeping control in step S108. The flight control device 40 performs the temperature keeping control to keep the battery temperature Tbt. In the temperature keeping control, the flight control device 40 drives an object to be energized so that the battery output current Ibt flows through the object to be energized. In the temperature keeping control, the electric power of the drive battery 31 is consumed by driving the object to be energized, and the battery temperature Tbt rises.

The flight control device 40 sets a target output in battery temperature keeping processing. The battery temperature keeping processing is processing for keeping the battery temperature Tbt in the temperature keeping control. The battery temperature keeping processing is processing for restricting a drop in the battery temperature Tbt, and may be referred to as temperature decrease restriction processing.

The function of the flight control device 40 executing the processing of step S108 corresponds to a temperature decrease restriction unit.

The target output in the battery temperature keeping processing is set to a value smaller than the target output in the battery temperature raising processing. The target output is, for example, a target output of the EPU 50. Therefore, the battery output current Ibt in the battery temperature keeping processing is smaller than the battery output current Ibt in the battery temperature raising processing. For example, the flight control device 40 sets the target output in the battery temperature keeping processing such that the battery output current Ibt becomes a temperature keeping current value IB. The temperature keeping current value IB is a value smaller than the temperature raising current value IA. When the battery temperature keeping processing is performed after the battery temperature raising processing, the battery output current Ibt decreases from the temperature raising current value IA to the temperature keeping current value IB.

In the present embodiment, the EPU 50 is taken as an object to be energized and the EPU 50 is driven by the temperature keeping control. Therefore, the energization amount to the EPU 50 becomes the temperature keeping current value IB. When the EPU 50 is driven by the temperature keeping control, the flight control device 40 performs the motor control on the motor device 80. In this case, the number of rotations of the rotor 20 in the battery temperature keeping processing is smaller than the number of rotations of the rotor 20 in the battery temperature raising processing.

In the EPU 50, the temperature keeping current value IB is output from the drive battery 31, whereby the electric power of the drive battery 31 is consumed and the drive battery 31 generates heat. In the temperature keeping control, the target output is set such that the battery temperature Tbt is kept while the generation of heat in the drive battery 31 by the output of the temperature keeping current value IB and the cooling of the drive battery 31 by the outside air are balanced. The flight control device 40 performs the battery temperature keeping processing for keeping the battery temperature Tbt by driving the object to be energized.

Figure 5:
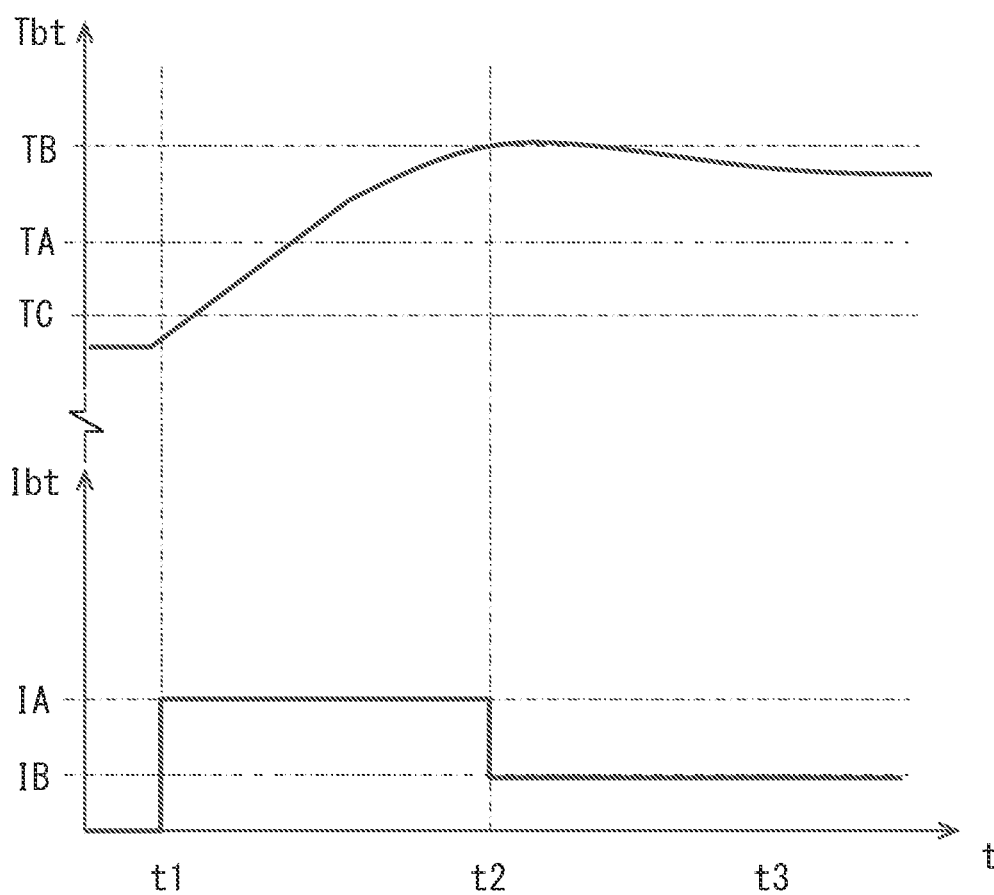
FIG. 5 is a diagram illustrating a change mode of a battery temperature and a change mode of a battery output current.

Next, a change mode of the battery temperature Tbt when the flight control processing is performed will be described with reference to FIG. 5. In FIG. 5, the outside air temperature Toa is lower than both the temperature keeping execution temperature TC and the take-off permitting temperature TA. Immediately before a timing t1, similarly to the outside air temperature Toa, the battery temperature Tbt is a temperature lower than both the temperature keeping execution temperature TC and the take-off permitting temperature TA.

At the timing t1, in response to the prohibition of the take-off of the eVTOL 10 in the flight control processing, the flight control device 40 starts the battery temperature raising processing. With the start of the battery temperature raising processing, the battery output current Ibt increases to the temperature raising current value IA. After the timing t1, since the battery output current Ibt is held at the temperature raising current value IA, the battery temperature Tbt gradually rises. The battery temperature Tbt rises to a temperature higher than both the temperature keeping execution temperature TC and the take-off permitting temperature TA by the battery temperature raising processing.

At a timing t2, the battery temperature Tbt is higher than the temperature raising end temperature TB. As the battery temperature Tbt exceeds the temperature raising end temperature TB, the battery temperature raising processing is ended. When the outside air temperature Toa is lower than the temperature keeping execution temperature TC, the battery temperature keeping processing is started with the end of the battery temperature raising processing. As the battery temperature keeping processing starts, the battery output current Ibt decreases to the temperature keeping current value IB. After the timing t2, since the battery output current Ibt is held at the temperature keeping current value IB, a decrease in the battery temperature Tbt is restricted. Therefore, the battery temperature Tbt is held at a value close to the temperature raising end temperature TB.

Differently from that shown in FIG. 5, for example, when the battery temperature Tbt is higher than the temperature keeping execution temperature TC due to the outside air temperature Toa being higher than the temperature keeping execution temperature TC, the battery temperature keeping processing is not performed. In this case, after the battery output current Ibt exceeds the temperature raising end temperature TB by the battery temperature raising processing, the battery temperature raising processing is ended and the battery temperature keeping processing is not performed, and thus the battery output current Ibt decreases to a value close to zero.

The vertical take-off of the eVTOL 10 is preferably started at a timing before the battery temperature Tbt decreases to the take-off permitting temperature TA. Regarding items other than keeping the battery temperature Tbt at a temperature higher than the take-off permitting temperature TA in the take-off preparation of the eVTOL 10, it is preferable to complete the items at a timing before the battery temperature Tbt decreases to the take-off permitting temperature TA.

According to the present embodiment described above, when the battery temperature Tbt of the drive battery 31 is lower than the take-off permitting temperature TA, the take-off of the eVTOL 10 is prohibited. With this configuration, it is possible to restrict a situation in which the eVTOL 10 takes off even though there is a concern that the output of the rotor 20 is insufficient due to the battery temperature Tbt being lower than the take-off permitting temperature TA. Therefore, it is possible to enhance the safety when the battery temperature Tbt has decreased in the eVTOL 10.

In order for the eVTOL 10 to take off vertically, a large output is required as the output of the rotor 20. On the other hand, output performance of the drive battery 31 deteriorates as the temperature decreases. For this reason, when the eVTOL 10 enters a take-off operation while the battery temperature Tbt is low in a cold region, there is a possibility that desired thrust cannot be obtained and the take-off operation is hindered. Accordingly, when the battery temperature Tbt is lower than the take-off permitting temperature TA, it is preferable to prohibit the take-off of the eVTOL 10.

According to the present embodiment, when the battery temperature Tbt is higher than the take-off permitting temperature TA, the take-off of the eVTOL 10 is not prohibited. With this configuration, a situation does not occur in which the take-off of the eVTOL 10 is prohibited even though the battery temperature Tbt is sufficiently high to an extent of exceeding the take-off permitting temperature TA. Therefore, it is possible to improve both the safety in the case where the battery temperature Tbt has decreased and the use of the eVTOL 10 in a balanced manner, without excessively enhancing the safety in terms of the battery temperature Tbt.

According to the present embodiment, when the take-off of the eVTOL 10 is prohibited, the battery temperature raising processing for raising the battery temperature Tbt is performed. Therefore, even if the battery temperature Tbt is lower than the take-off permitting temperature TA, the eVTOL 10 can take off when the battery temperature Tbt rises by the battery temperature raising processing. Accordingly, for example, even in a situation in which the drive battery 31 is cooled by the outside air in a cold region, the eVTOL 10 can be used.

According to the present embodiment, the processing of outputting the battery output current Ibt from the drive battery 31 is performed as the battery temperature raising processing. With this configuration, since discharge of the drive battery 31 is performed through the battery output current Ibt, the drive battery 31 generates heat and the battery temperature Tbt easily rises. Therefore, the battery temperature Tbt can be intentionally raised.

According to the present embodiment, the processing of driving the EPU 50 to raise the battery temperature Tbt is performed as the battery temperature raising processing. With this configuration, the rotor 20 is driven to rotate by the EPU 50 being driven by the electric power from the drive battery 31. Therefore, by restricting the rotation of the rotor 20 to such an extent that no thrust is generated on the eVTOL 10, the battery temperature Tbt can be raised by driving the EPU 50 without causing the eVTOL 10 to take off. In this way, in the eVTOL 10 on the ground, the EPU 50 is operated within a range in which the airframe is not unstable, so that the battery temperature Tbt can be raised by the output of the battery output current Ibt from the drive battery 31.

For example, different from the present embodiment, in a configuration in which only one rotor 20 is driven to rotate in order to raise the battery temperature Tbt, the one rotor 20 generates a force that makes the airframe of the eVTOL 10 unstable. Accordingly, in this configuration, there is a concern that the eVTOL 10 is likely to become unstable when only one rotor 20 is driven to rotate.

In contrast, according to the present embodiment, in the battery temperature raising processing, the EPU 50 is driven to drive at least two of the at least four rotors 20 provided in the eVTOL 10 to rotate. With this configuration, since at least two rotors 20 are driven to rotate in order to raise the battery temperature Tbt, forces generated by the at least two rotors 20 are likely to cancel each other out. Therefore, even if at least two rotors 20 are driven to rotate, a force that makes the eVTOL 10 unstable is less likely to increase. Accordingly, even if the battery output current Ibt increases in order to drive at least two rotors 20 to rotate, the airframe of the eVTOL 10 is less likely to become unstable.

Moreover, since the rotor 20 that is driven to rotate in the eVTOL 10 is limited not to all of the rotors 20 but to a portion of the rotors 20, the thrust is less likely to be generated in the eVTOL 10.

According to the present embodiment, when the battery temperature Tbt exceeds the temperature raising end temperature TB, the take-off prohibition of the eVTOL 10 is terminated. With this configuration, since the temperature raising end temperature TB is a temperature higher than the take-off permitting temperature TA, a situation is less likely to occur in which the battery temperature Tbt decreases to a temperature lower than the take-off permitting temperature TA immediately after the end of the battery temperature raising processing. Therefore, it is possible to restrict a situation in which the battery temperature Tbt becomes a temperature lower than the take-off permitting temperature TA at the time of take-off of the eVTOL 10 even though the battery temperature raising processing is performed. Accordingly, it is possible to prevent a situation in which the eVTOL 10 takes off with the battery temperature Tbt being lower than the take-off permitting temperature TA.

According to the present embodiment, when the battery temperature Tbt exceeds the temperature raising end temperature TB, the battery temperature raising processing is ended. With this configuration, since the temperature raising end temperature TB is higher than the take-off permitting temperature TA, the battery temperature Tbt can exceed the take-off permitting temperature TA even if the battery temperature Tbt slightly decreases after the end of the battery temperature raising processing. By raising the battery temperature Tbt to the temperature raising end temperature TB in this manner, the safety of the eVTOL 10 at the time of take-off can be enhanced.

According to the present embodiment, when the battery temperature Tbt does not exceed the temperature raising end temperature TB even after the upper limit time S1 elapses, the battery temperature raising processing is ended. In this case, it is possible to avoid a situation in which the battery temperature raising processing is continued over a long period of time even though a rising mode of the battery temperature Tbt is abnormal. Therefore, it is possible to prevent the electric power of the drive battery 31 from being wasted in a state where the battery temperature Tbt does not rise normally.

According to the present embodiment, after the battery temperature raising processing is performed, the battery temperature keeping processing for restricting a drop of the battery temperature Tbt is performed. With this configuration, it is possible to restrict a rapid decrease in the battery temperature Tbt with the end of the battery temperature raising processing. Therefore, it is easy to implement the take-off of the eVTOL 10 in a state where the battery temperature Tbt is higher than the take-off permitting temperature TA. Moreover, in the battery temperature keeping processing, since it is only necessary to restrict a drop in the battery temperature Tbt, it is possible to reduce the battery output current Ibt as compared to the battery temperature raising processing. Therefore, for example, it is possible to reduce the power consumption of the drive battery 31 as compared to a configuration different from the present embodiment in which the battery temperature raising processing is continued even though the battery temperature Tbt exceeds the temperature raising end temperature TB.

In the present embodiment, only when the outside air temperature Toa is lower than the temperature keeping execution temperature TC, the battery temperature keeping processing is performed after the battery temperature Tbt exceeds the temperature raising end temperature TB. In this way, by performing the battery temperature keeping processing for restricting a decrease in the battery temperature Tbt, it is possible to maintain a state in which the eVTOL 10 can take off at the battery temperature Tbt without using wasting energy of the drive battery 31.

Second Embodiment

In the first embodiment, the processing of raising the battery temperature Tbt by causing the drive battery 31 to output the battery output current Ibt is performed as the battery temperature raising processing. In contrast, in a second embodiment, processing of heating the drive battery 31 to raise the battery temperature Tbt is performed. Configurations, operations, and effects not particularly described in the second embodiment are the same as those in the first embodiment. In the second embodiment, differences from the first embodiment will be mainly described.

Figure 6:
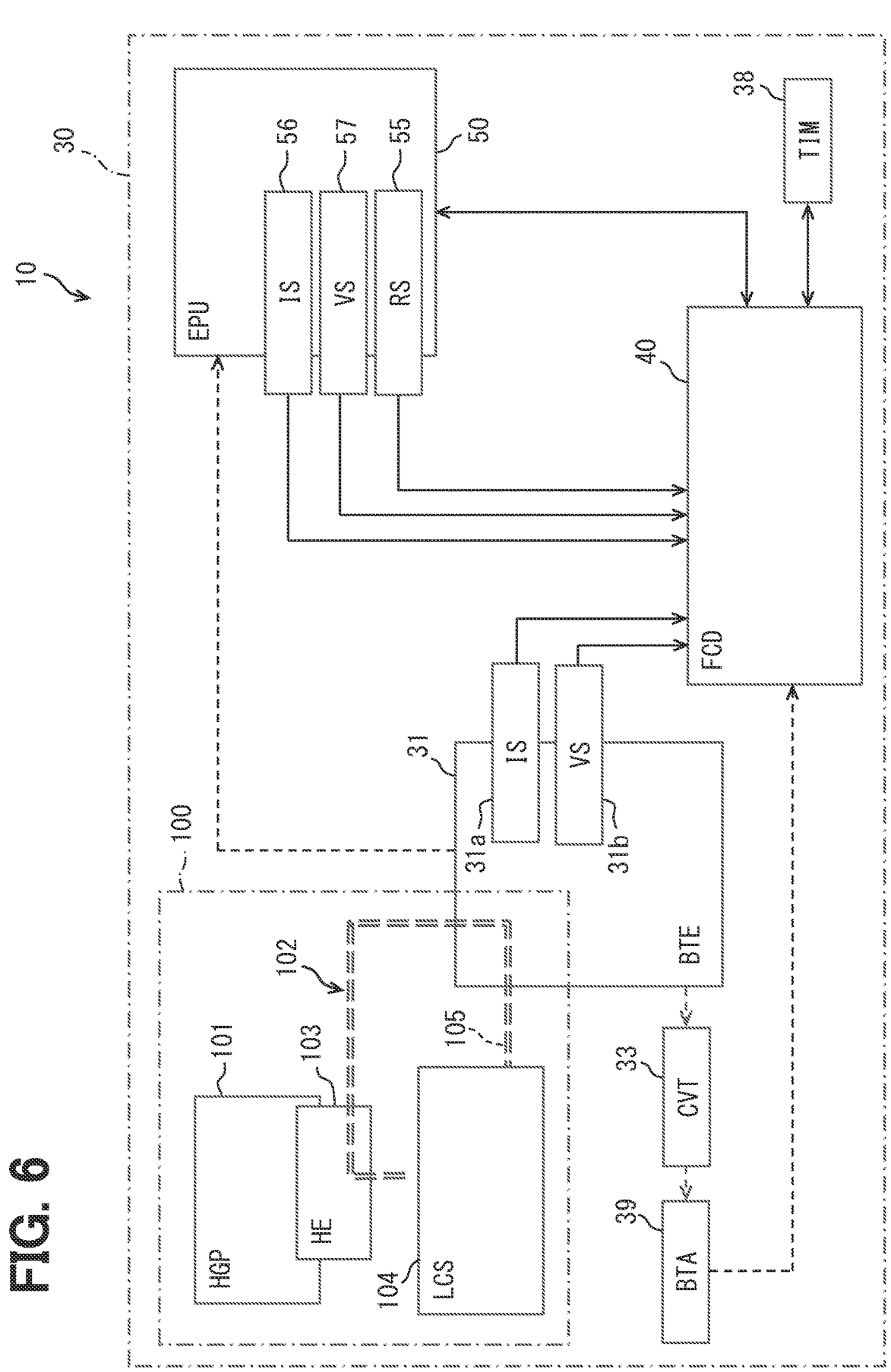
FIG. 6 is a block diagram illustrating an electrical configuration of a flight system according to a second embodiment.

The flight system 30 illustrated in FIG. 6 includes a heating device 100. The heating device 100 is mounted on the eVTOL 10 and is a system for heating the drive battery 31. The heating device 100 can raise the battery temperature Tbt by heating the drive battery 31.

The heating device 100 includes a heat-generating element 101 and a heat exchange device 102. The heat exchange device 102 includes a heat exchanger 103, a circulation device 104, and a circulation path 105. In FIG. 6, the heat-generating element 101 is denoted by HGP, the heat exchanger 103 by HE, and the circulation device 104 by LCS.

The heat-generating element 101 is a device or equipment capable of generating heat, and corresponds to a heat-generating portion. The heat-generating element 101 is a heat source that generates heat for heating the drive battery 31. The heat generated by the heat-generating element 101 is applied to the drive battery 31 via the heat exchange device 102. The heat-generating element 101 can heat the drive battery 31 and may be referred to as a heating unit. The heat-generating element 101 includes, for example, an electric heater. In the heat-generating element 101, for example, a heat generation amount is adjusted by controlling an energization amount to the heater. The heat-generating element 101 may include a combustion engine. The combustion engine is included in a heat engine such as an internal combustion engine, and is capable of generating heat by causing a fuel to combust such as gasoline. In the heat-generating element 101, for example, the heat generation amount is adjusted by controlling the combustion of fuel.

The heat exchange device 102 is capable of performing heat exchange between the heat-generating element 101 and the drive battery 31. In the heat exchange device 102, the heat of the heat-generating element 101 is applied to the drive battery 31 via a heat medium. The heat medium is a liquid such as cooling water, and is capable of applying heat of the heat-generating element 101 to the drive battery 31. The heat medium is capable of adjusting the battery temperature Tbt using heat of the heat-generating element 101, and may be referred to as a temperature adjustment liquid. The heat medium may be a fluid including a gas such as air.

The heat medium circulates through the circulation path 105 in the heat exchange device 102. The circulation path 105 is a flow channel through which the heat medium flows, and is formed by a path forming portion. The path forming portion is formed of a member such as a metal pipe and has thermal conductivity. The circulation device 104 pressure-feeds the heat medium in the circulation path 105 by a pump or the like so that the heat medium circulates through the circulation path 105. The heat exchange device 102 corresponds to a circulation portion that circulates the heat medium. The circulation device 104 may be referred to as a liquid circulation system that circulates a temperature adjustment liquid.

In the heating device 100, the heat medium flowing through the circulation path 105 exchanges heat with each of the heat-generating element 101 and the drive battery 31. The heat exchanger 103 is capable of performing heat exchange between the heat medium and the heat-generating element 101, and is provided, for example, between the circulation path 105 and the heat-generating element 101. The heating device 100 may include a heat exchange portion that performs heat exchange between the heat medium and the drive battery 31.

Figure 7:
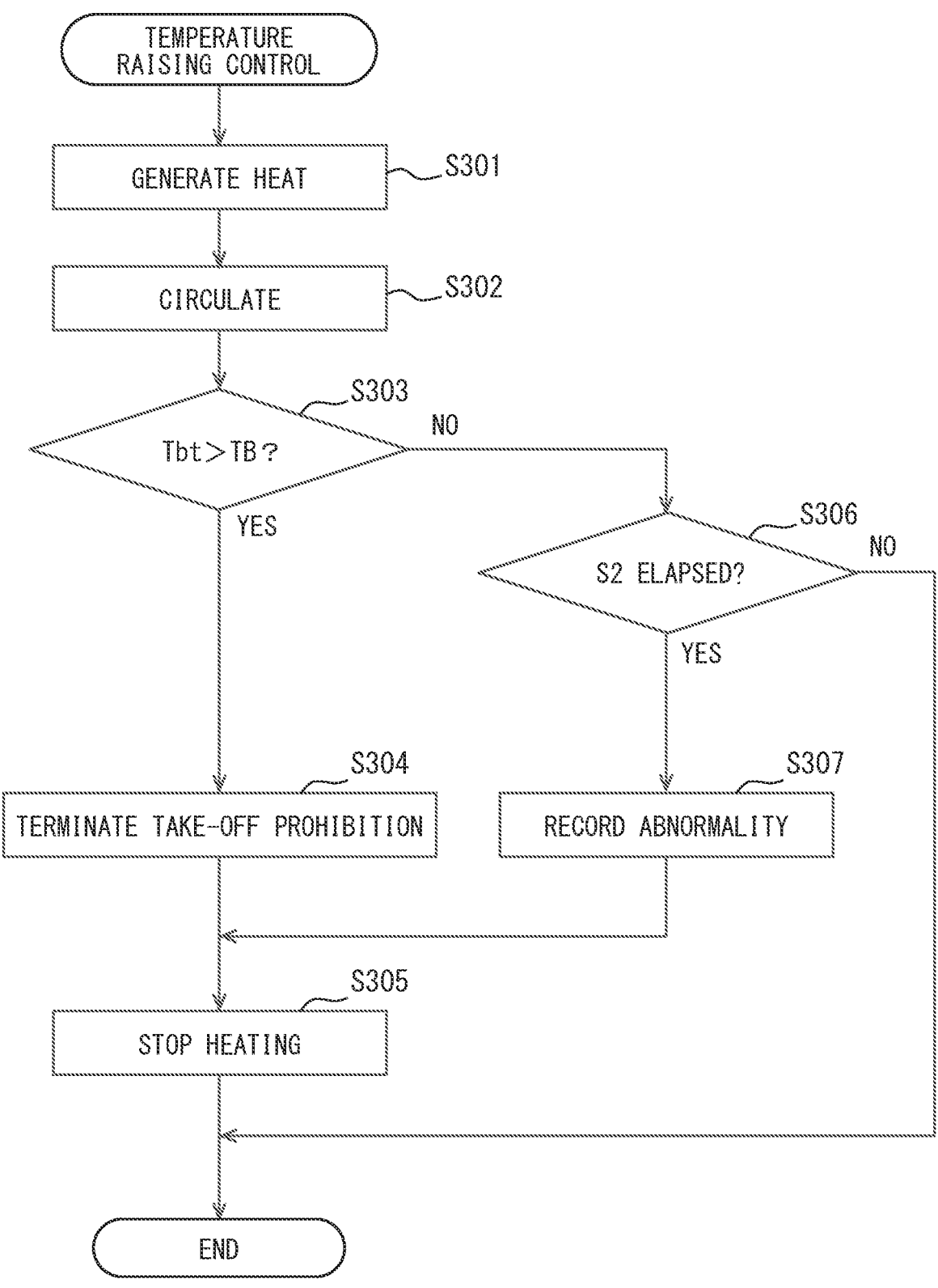
FIG. 7 is a flowchart illustrating a procedure of temperature raising control.

The flight control device 40 performs temperature raising control as in step S105 of the first embodiment. In the temperature raising control of the present embodiment, the temperature of the drive battery 31 is not raised by driving of the EPU 50; instead, the temperature of the drive battery 31 is raised by the heating device 100. The temperature raising control of the present embodiment will be described with reference to a flowchart shown in FIG. 7.

In steps S301 and S302 of the temperature raising control, the flight control device 40 performs heating processing using the heating device 100. In the heating processing, the flight control device 40 drives the heating device 100 to heat the drive battery 31 so that the battery temperature Tbt rises. The flight control device 40 causes the heat-generating element 101 to generate heat in step S301 of the heating processing. Here, when the heat-generating element 101 is turned on by the flight control device 40, the heat-generating element 101 starts to generate heat. For example, the flight control device 40 drives the heat-generating element 101 so that a current flowing through the heat-generating element 101 is at a first current value. The first current value is a current value for raising the temperature of the drive battery 31 by the heat of the heat-generating element 101.

The flight control device 40 circulates the heat medium using the heat exchange device 102 in step S302 of the heating processing. Here, the circulation of the heat medium is started when the circulation device 104 is turned on by the flight control device 40. When the heat generation of the heat-generating element 101 and the circulation of the heat medium are performed in the heating processing, the heat of the heat-generating element 101 is applied to the drive battery 31 via the heat medium, and the battery temperature Tbt rises. The function of the flight control device 40 executing the processing of steps S301 and S302 corresponds to a battery temperature raising unit and a heating execution unit.

In the heating processing, the heat generation of the heat-generating element 101 and the circulation of the heat medium by the heat exchange device 102 may be started at the same timing or at different timings. For example, after the heat generation of the heat-generating element 101 is started, the circulation of the heat medium by the heat exchange device 102 may be started at a timing when the temperature of the heat-generating element 101 is sufficiently high. Further, the heat generation of the heat-generating element 101 may be started after the circulation of the heat medium by the heat exchange device 102 is started.

In steps S303 and S304, the flight control device 40 performs the same processing as in steps S203 and S204 of the first embodiment. When the battery temperature Tbt becomes higher than the temperature raising end temperature TB, after take-off prohibition of the eVTOL 10 is terminated, the flight control device 40 proceeds to step S305. In step S305, the flight control device 40 stops the heating device 100 from heating the drive battery 31. Here, the flight control device 40 turns off the heat-generating element 101 and thus the heat generation of the heat-generating element 101 is stopped. The flight control device 40 turns off the circulation device 104 and thus the circulation of the heat medium is stopped. Further, the flight control device 40 sets, in a memory or the like, an end flag indicating that heating of the drive battery 31 by the heating device 100 is ended.

When the battery temperature Tbt is not higher than the temperature raising end temperature TB, the flight control device 40 proceeds to step S306. In step S306, the flight control device 40 determines whether an upper limit time S2 has elapsed from the start of heating of the drive battery 31 by the heating device 100. Here, a determination as to whether a heating time of the heating device 100 exceeds the upper limit time S2 is performed. The heating time is an elapsed time from the start of heating performed by the heating device 100. For example, the heating time is an elapsed time from turning on of both the heat-generating element 101 and the circulation device 104. The upper limit time S2 is an upper limit value of a time required until the battery temperature Tbt becomes higher than the temperature raising end temperature TB. When the eVTOL 10 is in a normal state, the battery temperature Tbt becomes higher than the temperature raising end temperature TB at a timing before the upper limit time S2 elapses from the start of heating performed by the heating device 100. That is, when no abnormality has occurred in the eVTOL 10, the heating time does not exceed the upper limit time S2. The upper limit time S2 is a value set according to a test result or the like, and is stored in the storage device 35.

The flight control device 40 may variably set the upper limit time S2 similarly to the upper limit time S1 of the first embodiment. For example, the flight control device 40 may set the upper limit time S2 to a longer time as a battery outside temperature is lower. The upper limit time S2 may be set to a longer time as the battery temperature Tbt immediately before the start of heating performed by the heating device 100 is lower.

When the upper limit time S2 has elapsed from the start of heating performed by the heating device 100, the flight control device 40 assumes that an abnormality has occurred in the eVTOL 10, and proceeds to step S307. In step S307, the flight control device 40 performs the same processing as in step S207 of the first embodiment.

After step S307, the flight control device 40 proceeds to step S305 and stops heating performed by the heating device 100. In this case, the flight control device 40 stops heating performed by the heating device 100, and does not terminate the take-off prohibition of the eVTOL 10. In step S306, when the upper limit time S2 has not elapsed from the start of heating performed by the heating device 100, the flight control device 40 ends the temperature raising control. In this case, the flight control device 40 does not stop heating performed by the heating device 100 and does not terminate the take-off prohibition of the eVTOL 10.

The flight control device 40 performs temperature keeping control as in step S108 of the first embodiment. In the temperature keeping control of the present embodiment, temperature keeping of the drive battery 31 is not performed by driving of the EPU 50; instead, temperature keeping of the drive battery 31 is performed by the heating device 100. In the temperature keeping control, the flight control device 40 drives the heating system 10 so that the battery output current Ibt flows through the heating device 100 serving as an object to be energized. In the temperature keeping control, heating by the heating system 10 is performed such that the heat applied from the heating system 10 to the drive battery 31 is less than that in the temperature raising control. For example, in the temperature keeping control, at least one of the heat generation amount of the heat-generating element 101 and a circulation amount of the heat medium is set to be smaller than that in the temperature raising control.

For example, the flight control device 40 drives the heat-generating element 101 so that the current flowing through the heat-generating element 101 is at a second current value. The second current value is a current value for keeping the temperature of the drive battery 31 by the heat of the heat-generating element 101, and is a value smaller than the first current value. In the heating device 100, when battery temperature keeping processing is performed after battery temperature raising processing, the current flowing through the heat-generating element 101 decreases from the first current value to the second current value. The decrease of the current flowing through the heat-generating element 101 in this manner is similar to the decrease of the battery output current Ibt from the temperature raising current value IA to the temperature keeping current value IB in the first embodiment.

According to the present embodiment, the processing of driving the heating device 100 to raise the battery temperature Tbt is performed as the battery temperature raising processing. In this configuration, the drive battery 31 is heated by the heating device 100. In the heating device 100, since the heat of the heat-generating element 101 is applied to the drive battery 31 via the heat medium, differently from the first embodiment, it is unnecessary to drive the rotor 20 to rotate. Therefore, for example, even in a situation in which the rotor 20 cannot be driven to rotate in the eVTOL 10, it is possible to raise the temperature of the drive battery 31 by driving the heating device 100.

Third Embodiment

In a third embodiment, temperature raising control for the drive battery 31 is performed when the drive battery 31 is being charged. Configurations, operations, and effects not particularly described in the third embodiment are the same as those in the first embodiment. In the third embodiment, differences from the first embodiment will be mainly described.

In the eVTOL 10, charging of the drive battery 31 is performed by a charging device. The charging device is detachably connected to the drive battery 31. The charging device includes a charging cable and is electrically connected to the drive battery 31 via the charging cable. When a current is output from the charging device, charging of the drive battery 31 is performed. The current output from the charging device is input to the drive battery 31 as a battery input current. The battery input current is a charging current for charging the drive battery 31.

The flight control device 40 performs temperature raising control for the eVTOL 10, in which the drive battery 31 can be charged, as in step S105 of the first embodiment. The flight control device 40 can execute the temperature raising control in both cases where the drive battery 31 is being charged and where the drive battery 31 is not being charged. The temperature raising control executed when the drive battery 31 is not being charged is referred to as first temperature raising control, and the temperature raising control executed when the drive battery 31 is being charged is referred to as second temperature raising control.

Figure 8:
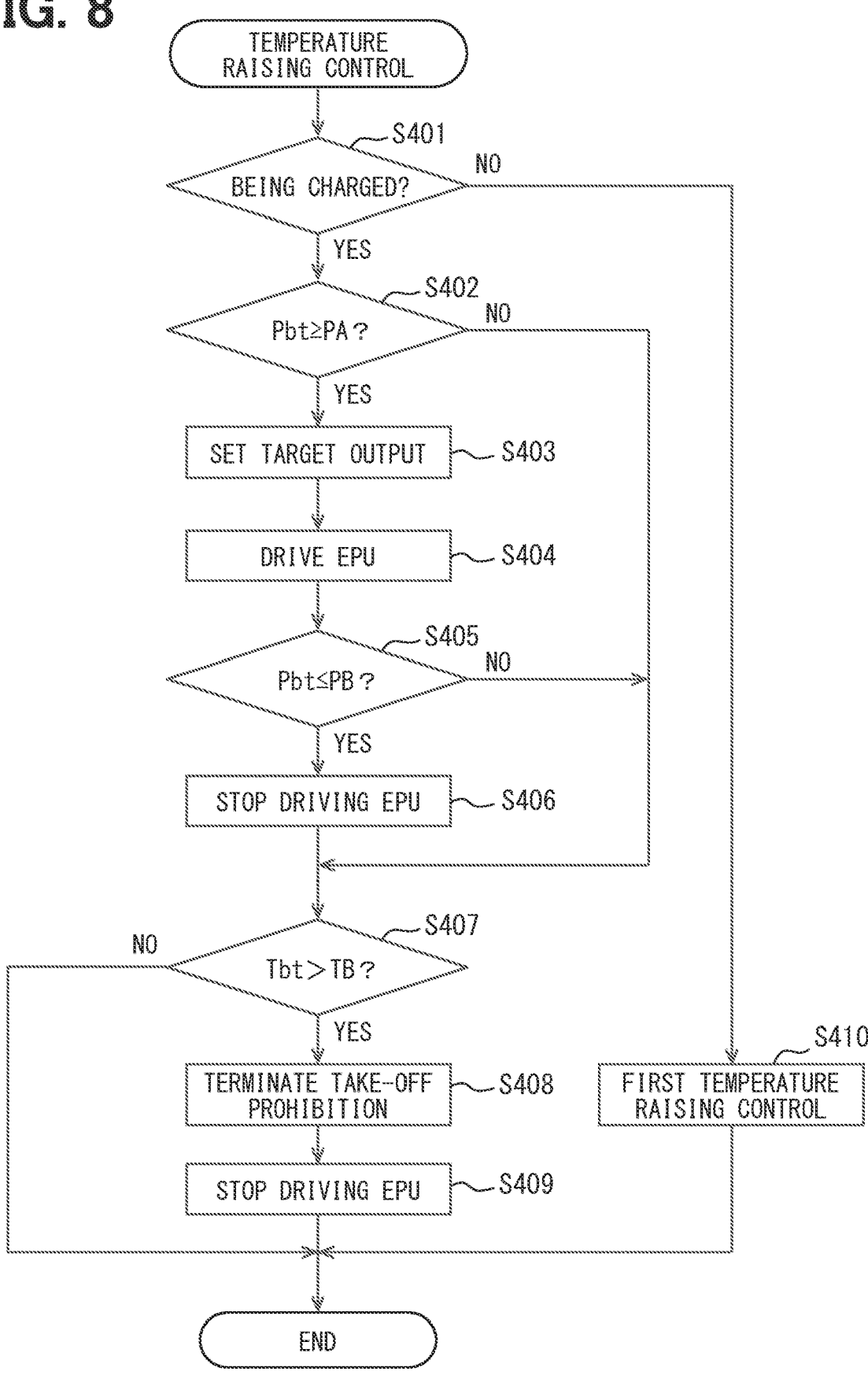
FIG. 8 is a flowchart illustrating a procedure of temperature raising control according to a third embodiment.

The temperature raising control of the present embodiment will be described with reference to a flowchart shown in FIG. 8. In step S401 of the temperature raising control, the flight control device 40 determines whether the drive battery 31 is being charged. Here, it is determined whether the drive battery 31 is being charged by the charging device. For example, the flight control device 40 determines whether a power cable is connected to the drive battery 31. When a power cable is connected to the drive battery 31, the flight control device 40 determines that charging is being performed. When no power cable is connected to the drive battery 31, the flight control device 40 determines that charging is not being performed.

When the drive battery 31 is not being charged, the flight control device 40 proceeds to step S410 and performs the first temperature raising control. As the first temperature raising control, the flight control device 40 performs the same processing as in step S105 of the first embodiment. If the heating device 100 is mounted on the eVTOL 10 as in the second embodiment, the flight control device 40 may perform the first temperature raising control using the heating device 100 as in the second embodiment.

When the drive battery 31 is being charged, the flight control device 40 performs the second temperature raising control in steps S402 to S409. In step S402 of the second temperature raising control, the flight control device 40 determines whether a battery power storage amount Pbt is equal to or greater than a target power storage amount PA. The battery power storage amount Pbt is the amount of electric power stored in the drive battery 31. The target power storage amount PA is set to, for example, an electric power upper limit value that is an upper limit of electric power that can be stored in the drive battery 31. The target power storage amount PA is a power storage amount that is sufficiently large for causing the eVTOL 10 to fly. The battery power storage amount Pbt corresponds to a power storage amount, and the target power storage amount PA corresponds to a target amount. When the battery power storage amount Pbt has reached the electric power upper limit value, charging of the drive battery 31 by the charging device is stopped. The target power storage amount PA may be referred to as a target charge amount.

When the battery power storage amount Pbt increases by charging of the charging device and reaches the target power storage amount PA, the flight control device 40 performs processing of steps S403 and S404. In steps S403 and S404, the flight control device 40 performs the same processing as in steps S201 and S202 of the first embodiment. Specifically, in steps S403 and S404, the flight control device 40 sets a target output, and performs battery temperature raising processing by driving the EPU 50 in accordance with the target output. The function of the flight control device 40 executing the processing of step S404 corresponds to a battery temperature raising unit, an output execution unit, and a current execution unit.

The battery power storage amount Pbt changes according to both a charging mode of the drive battery 31 by the charging device and a discharging mode of the drive battery 31 in driving the EPU 50. For example, when the battery input current for charging the drive battery 31 is larger than the battery output current Ibt discharged from the drive battery 31, the battery power storage amount Pbt increases with reference to the target power storage amount PA. On the other hand, when the battery input current is smaller than the battery output current Ibt, the battery power storage amount Pbt decreases with reference to the target power storage amount PA.

In step S405, the flight control device 40 determines whether the battery power storage amount Pbt is equal to or less than a power storage lower limit amount PB. The power storage lower limit amount PB is set to a value smaller than the target power storage amount PA. The power storage lower limit amount PB is a power storage amount that is not insufficient in causing the eVTOL 10 to fly. When the battery output current Ibt flowing with the driving of the EPU 50 is larger than the battery input current, the battery power storage amount Pbt decreases to the power storage lower limit amount PB due to continuation of the driving of the EPU 50. The power storage lower limit amount PB corresponds to a lower limit amount.

When the battery power storage amount Pbt has decreased to the power storage lower limit amount PB, the flight control device 40 proceeds to step S406. The flight control device 40 stops the driving of the EPU 50 in step S406.

When the driving of the EPU 50 is stopped, the decrease in the battery power storage amount Pbt stops. When the drive battery 31 is continuously charged by the charging device even after the driving of the EPU 50 is stopped, the battery power storage amount Pbt increases again. When the battery power storage amount Pbt has reached the electric power upper limit value, charging of the drive battery 31 is ended. The function of the flight control device 40 executing the processing of step S406 corresponds to a drive stop unit.

After step S406, the flight control device 40 performs processing of steps S407 to S409. In steps S407 to S409, the flight control device 40 performs the same processing as in steps S203 to S205 of the first embodiment. Specifically, when the battery temperature Tbt is higher than the temperature raising end temperature TB, the flight control device 40 terminates take-off prohibition of the eVTOL 10 and stops the driving of the EPU 50. The function of the flight control device 40 executing the processing of step S408 corresponds to a restriction termination unit, and the function of executing the processing of step S409 corresponds to a temperature raising end unit.

In step S405, when the battery power storage amount Pbt has not decreased to the power storage lower limit amount PB, the flight control device 40 performs the processing of steps S407 to S409 without stopping the driving of the EPU 50. In addition, in step S402, when the battery power storage amount Pbt has not reached the target power storage amount PA by charging of the drive battery 31, the processing of steps S407 to S409 is performed without performing the battery temperature raising processing by the driving of the EPU 50. In step S407, when the battery temperature Tbt has not reached the temperature raising end temperature TB, the processing of S401 to S410 is performed again as the temperature raising control.

The charging of the drive battery 31 will be collectively described. The drive battery 31 generates heat due to being charged. Therefore, when the drive battery 31 is being charged, it is unnecessary to drive the EPU 50 as the battery temperature raising processing. However, in a case where the battery temperature Tbt is still low to an extent of not reaching the take-off permitting temperature TA when the battery power storage amount Pbt has reached the target power storage amount PA by charging, further charging is restricted. Therefore, the EPU 50 is driven to cause the drive battery 31 to discharge electricity in order to promote temperature rise of the drive battery 31, and the battery power storage amount Pbt is reduced. However, if the drive battery 31 is caused to discharge too much electricity, it goes against the purpose of charging that is to increase the battery power storage amount Pbt. Therefore, when the electric power of the drive battery 31 is consumed to a certain extent, the driving of the EPU 50 is stopped and the charging of the drive battery 31 is continued. This operation is repeated until the battery temperature Tbt exceeds the temperature raising end temperature TB.

In the present embodiment, the charging mode of the drive battery 31 charged by the charging device may be controlled by the flight control device 40. For example, when the battery power storage amount Pbt has reached the target power storage amount PA in the temperature raising control, the flight control device 40 may temporarily restrict the charging device from charging the drive battery 31. The restriction on charging imposed by the flight control device 40 includes stopping the charging of the drive battery 31, reducing the charging current supplied from the charging device to the drive battery 31, and the like. For example, the flight control device 40 may reduce the charging current by switching the charging mode of the drive battery 31 from quick charging to normal charging. A charging current in the quick charging is larger than a charging current in the normal charging.

By restricting the charging current by the flight control device 40 in this way, the battery input current becomes smaller than the battery output current Ibt, and the battery power storage amount Pbt is likely to decrease. Therefore, it is unnecessary to increase the battery output current Ibt by rotating the rotor 20 to an extent that the eVTOL 10 becomes unstable in order to reduce the battery power storage amount Pbt. Accordingly, even without excessively increasing the battery output current Ibt, the temperature of the drive battery 31 is easily raised by discharge of electricity of the drive battery 31.

In contrast, for example, when the battery input current is larger than the battery output current Ibt, the battery power storage amount Pbt is less likely to decrease. In this case, there is a concern that the battery temperature Tbt is less likely to rise due to the fact that the battery power storage amount Pbt is less likely to decrease. Examples of the case where the battery input current is likely to be larger than the battery output current Ibt include a case where the battery temperature raising processing is performed in a state where quick charging is performed.

According to the present embodiment, when the battery temperature Tbt is lower than the take-off permitting temperature TA and the battery power storage amount Pbt has reached the target power storage amount PA, the battery output current Ibt is output from the drive battery 31. With this configuration, even when the battery power storage amount Pbt has reached the target power storage amount PA, the temperature of the drive battery 31 can be raised by the output of the battery output current Ibt. As described above, when the battery power storage amount Pbt reaches the target power storage amount PA and further charging is difficult, the EPU 50 is driven to raise the temperature of the drive battery 31, and thus it is possible to raise the temperature of the drive battery 31 while restricting wasteful charging of the drive battery 31.

According to the present embodiment, when the EPU 50 is driven with the drive battery 31 in a state of being charged and the battery power storage amount Pbt decreases to the power storage lower limit amount PB, the driving of the EPU 50 is stopped. With this configuration, by stopping the driving of the EPU 50, it is possible to restrict the battery power storage amount Pbt from further decreasing below the power storage lower limit amount PB. Therefore, the electric power of the drive battery 31 can be used to raise the temperature of the drive battery 31 within a range in which the flight of the eVTOL 10 is not hindered.

The disclosure in the present description is not limited to the illustrated embodiments. The disclosure includes exemplary embodiments and modifications by those skilled in the art based on the exemplary embodiments. For example, the disclosure is not limited to the combination of components and elements described in the embodiments, and various modifications can be implemented. The disclosure can be implemented in various combinations. The disclosure can have an additional portion that can be added to the embodiments. The disclosure includes components and elements omitted from the embodiments. The disclosure includes the replacement or combination of components, elements between one embodiment and other embodiments. The disclosed technical scope is not limited to the description of the embodiments. The disclosed technical scope is indicated by the description of the claims, and should be construed to include all changes within the meaning and range equivalent to the description of the claims.

In the second embodiment, the circulation path 105 through which the heat medium flows in the heating device 100 may be switchable. For example, in the heating device 100, multiple medium flow channels through which the heat medium can flow may be provided, and a flow channel forming the circulation path 105 may be selectively switched among the multiple medium flow channels. The flow channel selected as the circulation path 105 among the multiple medium flow channels may be the same or different when eVTOL 10 is on the ground and when eVTOL 10 is in flight. The circulation path 105 may be switched by providing a flow channel switching unit such as a valve for the multiple medium flow channels. Further, as long as the battery temperature raising processing is performed both when the eVTOL 10 is on the ground and when the eVTOL 10 is in flight, the circulation path 105 in the case of being on the ground may allow the heat medium to more easily radiate heat to the drive battery 31 than the circulation path 105 in the case of being in flight.

In the embodiments described above, at least one of the processing of driving the EPU 50 in the first embodiment and the processing of driving the heating device 100 in the second embodiment may be performed as the battery temperature raising processing and the battery temperature keeping processing. For example, when the battery outside temperature is lower than the first reference temperature, both the EPU 50 and the heating device 100 are driven. With this configuration, when the battery outside temperature is higher than the first reference temperature and lower than the second reference temperature, only one of the EPU 50 and the heating device 100 is driven.

In the second embodiment, the EPU 50 may be used as the heat-generating element 101 of the heating device 100. That is, in the heating device 100, the heat medium circulated by the heat exchange device 102 may exchange heat with at least one of the heat-generating element 101 and the EPU 50. If the heat medium can exchange heat with both the heat-generating element 101 and the EPU 50, the circulation path 105 is shared by the heat-generating element 101 and the EPU 50.

For example, in a configuration in which the heat of the EPU 50 is applied to the drive battery 31 via the heat medium, the temperature of the drive battery 31 is raised by both discharge of electricity of the drive battery 31 accompanying the driving of the EPU 50 and heat generated accompanying the driving of the EPU 50. With this configuration, since the heat generated by the drive battery 31 is absorbed by the heat medium, the power consumption of the heat-generating element 101 can be reduced. Further, in this configuration, the heat of only the EPU 50 of the heat-generating element 101 and the EPU 50 is applied to the heat medium, and thus the heat-generating element 101 can be omitted.

In the embodiments described above, in the battery temperature raising processing and the battery temperature keeping processing, the object to be energized that is to be driven is not limited to the EPU 50. For example, at least one of the tilt mechanism and the air conditioner may be driven as the battery temperature raising processing. In this case, the battery output current Ibt from the drive battery 31 flows to at least one of the tilt mechanism and the air conditioner. Also in this case, the drive battery 31 can discharge electricity by energization to an object to be energized, and the battery temperature Tbt can be raised. In addition, the object to be energized that is to be driven may be different in the battery temperature raising processing and the battery temperature keeping processing. For example, the EPU 50 may be driven in the battery temperature raising processing, and the air conditioner may be driven in the battery temperature keeping processing. If the EPU 50 includes a blower fan, the EPU 50 may drive only the blower fan to rotate among the rotor 20 and the blower fan in the battery temperature raising processing and the battery temperature keeping processing.

In the embodiments described above, when the battery temperature Tbt is lower than the take-off permitting temperature TA, the flight control device 40 only needs to be able to restrict the take-off of the eVTOL 10. For example, in a case where the battery temperature Tbt is lower than the take-off permitting temperature TA, the take-off prohibition flag may be released only when a specific operation is performed by a specific pilot with respect to the flight control device 40, for example. Also in this case, the flight control device 40 places a restriction on the take-off of the eVTOL 10. With respect to the eVTOL 10, one type of restriction on take-off is prohibition of take-off.

In the embodiments described above, regarding the battery temperature Tbt, the restriction terminating temperature at which the take-off restriction of the eVTOL 10 is terminated may be different from the temperature raising end temperature at which the battery temperature raising processing is ended. For example, in the first embodiment, the restriction terminating temperature may be set to a temperature lower than the temperature raising end temperature TB. With this configuration, even after the battery temperature Tbt exceeds the restriction terminating temperature and the take-off restriction of the eVTOL 10 is terminated, the battery temperature raising processing is continuously performed.

In the embodiments described above, the take-off permitting temperature TA may be variably set. For example, the flight control device 40 may variably set the take-off permitting temperature TA according to aircraft information of the eVTOL 10. The aircraft information includes information on a weight of the eVTOL 10, information on a size thereof, and the like. The information on a weight includes information indicating an aircraft weight and information indicating an additional weight. The information indicating an additional weight include information indicating the number of occupants and information indicating a total weight of loads. For example, the flight control device 40 sets the take-off permitting temperature TA to a lower temperature as the eVTOL 10 is lighter. When the eVTOL 10 is light, even if the output of the rotor 20 is low due to the battery temperature Tbt being low, it is possible to ensure the output of the rotor 20 to the extent that the safety of the eVTOL 10 is not impaired. Therefore, even if the take-off permitting temperature TA is set to a lower temperature as the eVTOL 10 is lighter, it is possible to cause the eVTOL 10 to fly while ensuring the safety of the eVTOL 10.

Similarly to the take-off permitting temperature TA, the temperature raising end temperature TB and the temperature keeping execution temperature TC may be variably set according to the aircraft information or the like. For example, the temperature raising end temperature TB and the temperature keeping execution temperature TC may be variably set according to the outside air temperature Toa. The upper limit times S1 and S2 may be variably set according to the aircraft information or the like. Further, the target power storage amount PA and the power storage lower limit amount PB may be variably set according to the aircraft information or the like.

In the embodiments described above, a temperature sensor that detects the temperature of the drive battery 31 may be provided for the drive battery 31.

In the embodiments described above, the eVTOL 10 may not be the tiltrotor aircraft. That is, one rotor 20 does not need to serve as both the lift rotor and the cruise rotor. For example, one rotor 20 functions as only one of the lift rotor and the cruise rotor. With this configuration, in the eVTOL 10, the multiple rotors 20 include a lift rotor and a cruise rotor. In the eVTOL 10, the lift rotor is driven when the eVTOL 10 ascends, and the cruise rotor is driven when the eVTOL 10 advances in the front direction. The lift rotor may be referred to as a hover rotor.

In the embodiments described above, the vertical take-off and landing aircraft on which the flight control device 40 is mounted may be an electric-powered vertical take-off and landing aircraft in which at least one rotor 20 is driven by at least one EPU 50. For example, one rotor 20 may be driven by multiple EPUs 50, or multiple rotors 20 may be driven by one EPU 50.

In the embodiments described above, the flight vehicle on which the flight control device 40 is mounted may not be a vertical take-off and landing aircraft as long as the flight vehicle is electric-powered. For example, the flight vehicle may be an electric aircraft capable of taking off and landing while gliding. Further, the flight vehicle may be a rotary-wing aircraft or a fixed-wing aircraft. The flight vehicle may be an unmanned flight vehicle with no person on board.

In the embodiments described above, the flight control device 40 is provided by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units (gate circuits). The digital circuit may include a memory in which at least one of a program and data is stored. The computer may be implemented by an analog circuit. The computer may be implemented by a combination of the digital circuit and the analog circuit.

(ii) The hardware processor may be at least one processor core that executes a program stored in at least one memory. In this case, the computer is implemented by at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of (i) and (ii) described above. (i) and (ii) are provided on different chips or on a common chip.

That is, at least one of means and functions provided by the flight control device 40 can be provided by hardware alone, software alone, or a combination thereof.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A control device for an electric flight vehicle configured to control the electric flight vehicle and provided in the electric flight vehicle, the electric flight vehicle having a rotary wing driven by electric power of a battery and configured to rotate and cause the electric flight vehicle to fly, the control device comprising:

a temperature acquisition unit configured to acquire a temperature of the battery as a battery temperature;

a take-off restriction unit configured to place restriction on take-off of the electric flight vehicle when the battery temperature acquired by the temperature acquisition unit is lower than a take-off permitting temperature that is a temperature for permitting take-off of the electric flight vehicle;

a battery temperature raising unit configured to perform battery temperature raising processing for raising the battery temperature when the restriction is placed on take-off of the electric flight vehicle by the take-off restriction unit;

a restriction termination unit configured to terminate the restriction placed on take-off of the electric flight vehicle when the battery temperature exceeds a restriction terminating temperature and the battery temperature raising processing is performed by the battery temperature raising unit, the restriction terminating temperature being higher than the take-off permitting temperature; and a drive device configured to receive electric power from the battery to drive the rotary wing to rotate, wherein the rotary wing of the electric flight vehicle is one of at least four rotary wings, the battery temperature raising unit is configured to set a target output, which is related to the rotary wing, such that the rotary wing is driven to rotate at a number of rotations to generate thrust that does not cause the electric flight vehicle to ascend, and a drive execution unit is configured to drive the drive device such that at least two of the rotary wings are driven at the target output to rotate to raise the battery temperature.

2. The control device according to claim 1, wherein, the battery temperature raising unit includes an output execution unit configured to raise the battery temperature by causing the battery to output an electric current to an object to be energized.

3. The control device according to claim 2, wherein, the output execution unit includes a current execution unit configured to cause the battery to output a current to the object to be energized when the battery temperature is lower than the take-off permitting temperature and a power storage amount of the battery is greater than or equal to a target amount.

4. The control device according to claim 1, wherein the battery temperature raising unit includes the drive execution unit, which is configured to raise the battery temperature by driving the drive device.

5. The control device according to claim 4, further comprising:

a drive stop unit configured to stop driving of the drive device when the battery is being charged by a charging device, the drive device is driven by the drive execution unit, and a power storage amount of the battery has been decreased to a lower limit amount.

6. The control device according to claim 1, the electric flight vehicle being provided with a heating device, the heating device including a heat-generating portion configured to generate heat and a circulation portion configured to circulate a heat medium for transferring heat of the heat-generating portion to the battery, wherein, the battery temperature raising unit includes a heating execution unit configured to raise the battery temperature by driving the heating device.

7. The control device according to claim 1, further comprising:

a temperature raising end unit configured to end the battery temperature raising processing when the battery temperature exceeds a temperature raising end temperature and the battery temperature raising processing is performed by the battery temperature raising unit, the temperature raising end temperature being higher than the take-off permitting temperature.

8. The control device according to claim 1, wherein the battery temperature raising unit ends the battery temperature raising processing when the battery temperature raising processing has been continued for an upper limit time but the battery temperature has not exceeded a temperature raising end temperature.

9. The control device according to claim 1, further comprising:

a temperature decrease restriction unit configured to perform temperature decrease restriction processing for restricting a decrease in the battery temperature after the battery temperature raising processing performed by the battery temperature raising unit.

10. The control device according to claim 1, wherein the take-off restriction unit prohibits take-off of the electric flight vehicle.

11. The control device according to claim 1, wherein the take-off restriction unit is configured not to place the restriction on take-off of the electric flight vehicle when the battery temperature is higher than the take-off permitting temperature.

12. The control device according to claim 1, wherein the electric flight vehicle is an electric aircraft including a drive device configured to cause the electric aircraft to fly, and the drive device includes a motor to be driven by electric power of the battery and drives the rotary wing to rotate by driving of the motor.

13. The control device according to claim 1, wherein, the battery temperature raising unit includes an output execution unit configured to raise the battery temperature by causing the battery to output an electric current to an object to be energized, the output execution unit includes a current execution unit configured to cause the battery to output a current to the object to be energized, when the battery temperature is lower than the take-off permitting temperature and a power storage amount of the battery reaches a target amount, stop output of the current, when the electric power of the battery is consumed to a certain extent due to output of the current, and continue charging of the battery.

14. The control device according to claim 1, further comprising:

a battery temperature keeping unit configured to perform a battery temperature keeping processing for restricting drop of the battery temperature, only when outside air temperature is lower than a temperature keeping execution temperature.

15. The control device according to claim 1, further comprising:

a battery temperature keeping unit configured to perform a battery temperature keeping processing for restricting drop of the battery temperature by causing the battery to output a temperature keeping current to an object to be energized, only when outside air temperature is lower than a temperature keeping execution temperature, wherein the battery temperature raising unit includes an output execution unit configured to raise the battery temperature by causing the battery to output a temperature raising current to the object to be energized, when the battery temperature is lower than the take-off permitting temperature, and the temperature keeping current is smaller than the temperature raising current.

16. The control device according to claim 15, wherein the temperature keeping execution temperature is lower than the take-off permitting temperature.

17. A non-transitory computer readable medium storing a computer program for an electric flight vehicle, the electric flight vehicle having a rotary wing, which is one of at least four rotary wings, driven by electric power of a battery, the rotary wing configured to rotate and cause the electric flight vehicle to fly, the computer program comprising instructions configured to, when the program is executed by at least one processor, cause the at least one processor to carry out:

acquiring a temperature of the battery as a battery temperature;

placing restriction on take-off of the electric flight vehicle when the battery temperature is lower than a take-off permitting temperature that is a temperature for permitting take-off of the electric flight vehicle;

performing a battery temperature raising processing for raising the battery temperature when the restriction is placed on take-off of the electric flight vehicle;

terminating the restriction placed on take-off of the electric flight vehicle when the battery temperature exceeds a restriction terminating temperature and the battery temperature raising processing is performed, the restriction terminating temperature being higher than the take-off permitting temperature;

setting a target output, which is related to the rotary wing, such that the rotary wing is driven to rotate at a number of rotations to generate thrust that does not cause the electric flight vehicle to ascend; and driving at least two of the rotary wings to rotate at the target output to raise the battery temperature.

\* \* \* \* \*